United States Patent
Ito et al.

(10) Patent No.: US 9,932,488 B2
(45) Date of Patent: Apr. 3, 2018

(54) RESIN COMPOSITION, OPTICAL COMPENSATION FILM USING SAME, AND PRODUCTION METHOD FOR SAME

(71) Applicant: TOSOH CORPORATION, Shunan-shi (JP)

(72) Inventors: Masayasu Ito, Mie (JP); Shinsuke Toyomasu, Mie (JP); Takahiro Kitagawa, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 18 days.

(21) Appl. No.: 14/895,360

(22) PCT Filed: Jun. 4, 2014

(86) PCT No.: PCT/JP2014/064805
§ 371 (c)(1),
(2) Date: Dec. 2, 2015

(87) PCT Pub. No.: WO2014/196552
PCT Pub. Date: Dec. 11, 2014

(65) Prior Publication Data
US 2016/0115333 A1    Apr. 28, 2016

(30) Foreign Application Priority Data

Jun. 7, 2013  (JP) .................. 2013-121273
Jul. 12, 2013 (JP) .................. 2013-146714
Jul. 30, 2013 (JP) .................. 2013-158166
Jan. 24, 2014 (JP) .................. 2014-011508
May 14, 2014 (JP) .................. 2014-100895

(51) Int. Cl.
| | |
|---|---|
| *C08L 1/26* | (2006.01) |
| *C08L 1/28* | (2006.01) |
| *C08L 35/02* | (2006.01) |
| *C09D 101/28* | (2006.01) |
| *C08J 5/18* | (2006.01) |
| *C08J 7/04* | (2006.01) |

(Continued)

(52) U.S. Cl.
CPC ............. *C09D 101/28* (2013.01); *C08J 5/18* (2013.01); *C08J 7/047* (2013.01); *C08L 1/26* (2013.01); *C08L 35/00* (2013.01); *C08L 35/02* (2013.01); *G02B 5/3083* (2013.01); *C08J 2301/26* (2013.01); *C08J 2301/28* (2013.01); *C08J 2331/06* (2013.01); *C08J 2367/02* (2013.01); *C08J 2401/26* (2013.01); *C08J 2431/06* (2013.01); *C08J 2435/02* (2013.01)

(58) Field of Classification Search
CPC .................. C08L 1/28; C08L 35/02
See application file for complete search history.

(56) References Cited

U.S. PATENT DOCUMENTS

| | | | | |
|---|---|---|---|---|
| 3,793,272 A | * | 2/1974 | Koyanagi et al. ...... | C08B 11/08 524/44 |
| 3,817,896 A | * | 6/1974 | Bergmeister et al. .. | C08F 10/00 524/817 |

(Continued)

FOREIGN PATENT DOCUMENTS

| | | | |
|---|---|---|---|
| AU | 6603277 A | * | 1/1975 |
| JP | 05-297223 A | | 11/1993 |

(Continued)

OTHER PUBLICATIONS

Machine translated English language equivalent of JP 2010-128166 (2010, 8 pages).*

(Continued)

*Primary Examiner* — Brieann R Johnston
(74) *Attorney, Agent, or Firm* — Oblon, McClelland, Maier & Neustadt, L.L.P.

(57) ABSTRACT

A resin composition including from 30 to 99 wt % of a cellulose-based resin represented by the following formula (1) and from 70 to 1 wt % of a fumaric acid ester polymer containing 30 mol % or more of a fumaric acid diester residue unit represented by the following formula (2); an optical compensation film using the same; and a production method of the optical compensation film.

[Chem. 1]

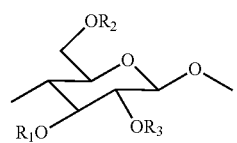

(1)

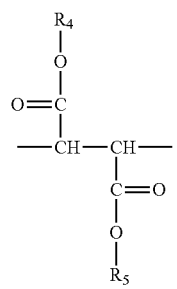

(2)

(wherein $R_1$ to $R_3$ represent a substituent having a carbon number of 1 to 12, and $R_4$ and $R_5$ represent an alkyl group having a carbon number of 1 to 12).

17 Claims, No Drawings

(51) Int. Cl.
  *G02B 5/30* (2006.01)
  *C08L 35/00* (2006.01)

(56) References Cited

U.S. PATENT DOCUMENTS

| | | | | |
|---|---|---|---|---|
| 4,871,791 A | * | 10/1989 | Hammer | A22C 13/0013 |
| | | | | 426/105 |
| 5,245,456 A | | 9/1993 | Yoshimi et al. | |
| 6,228,937 B1 | * | 5/2001 | Eck | C04B 24/28 |
| | | | | 524/503 |
| 7,709,572 B2 | * | 5/2010 | Takebe | C08B 3/16 |
| | | | | 525/54.21 |
| 2008/0068545 A1 | | 3/2008 | Doi et al. | |
| 2014/0153096 A1 | | 6/2014 | Doi et al. | |
| 2014/0168771 A1 | | 6/2014 | Zhou et al. | |

FOREIGN PATENT DOCUMENTS

| | | |
|---|---|---|
| JP | 05-323120 A | 12/1993 |
| JP | 2818983 B2 | 10/1998 |
| JP | 2001-337222 A | 12/2001 |
| JP | 2006-328132 A | 12/2006 |
| JP | 2007-310105 A | 11/2007 |
| JP | 2007-316559 A | 12/2007 |
| JP | 2008-064817 A | 3/2008 |
| JP | 2010128166 A * | 6/2010 |
| JP | 2013-028741 A | 2/2013 |
| WO | 2013/018651 A1 | 2/2013 |
| WO | WO 2013/025397 A1 | 2/2013 |

OTHER PUBLICATIONS

International Search Report dated Sep. 2, 2014 for PCT/JP2014/064805 filed on Jun. 4, 2014.
Extended European Search Report dated Oct. 25, 2016 in Patent Application No. 14807950.2.
Notification of Reasons for Refusal dated Jul. 27, 2016 in Japanese Patent Application No. 2014-100895 (with unedited computer generated English translation provided by Global Dossier).
Office Action dated Oct. 30, 2017, in Taiwanese patent application No. 103119667 (w/ English translation).
European Office Action dated Feb. 2, 2018, in European Patent Application No. 14807950.2 (7 pages).

* cited by examiner

RESIN COMPOSITION, OPTICAL COMPENSATION FILM USING SAME, AND PRODUCTION METHOD FOR SAME

TECHNICAL FIELD

The present invention relates to a resin composition, an optical compensation film using the same, and a production method thereof. More specifically, the present invention relates to a resin composition, an optical compensation film for a liquid crystal display, which is excellent in the retardation characteristics and wavelength dispersion characteristics, and a production method thereof.

BACKGROUND ART

A liquid crystal display is being widely used as a most important display device in the multimedia society, including applications ranging from a cellular phone to a computer monitor, a laptop computer and a television set. In a liquid crystal display, many optical films are used so as to enhance display characteristics. Among others, an optical compensation film plays a great role in, for example, improving the contrast or compensating the color tone when the display is viewed from the front or oblique direction.

The liquid crystal display includes many systems such as vertical alignment type (VA-LCD), in-plane switching liquid crystal display (IPS-LCD), super twisted nematic liquid crystal display (STN-LCD), reflective liquid crystal display and transflective liquid crystal display, and an optical compensation film suited for the display is required.

As the conventional optical compensation film, a stretched film of a cellulose-based resin, a polycarbonate, a cyclic polyolefin, etc. is used. In particular, a film composed of a cellulose-based resin, such as triacetyl cellulose film, is being widely used because of its good adhesiveness to a polyvinyl alcohol as a polarizer.

However, the optical compensation film composed of a cellulose-based resin has several problems. For example, although a cellulose-based resin film is processed into an optical compensation film having a retardation value appropriate to various displays by adjusting the stretching conditions, the three-dimensional refractive indices of a film obtained by the uniaxial or biaxial stretching of a cellulose-based resin are ny≥nx>nz and in order to produce an optical compensation film having other three-dimensional refractive indices, e.g., three-dimensional refractive indices of ny>nz>nx or ny=nz>nx, a special stretching method of, for example, adhering a heat-shrinkable film to one surface or both surfaces of the film and heating/stretching the laminate to apply a shrinking force in the thickness direction of the polymer film is required, which makes it difficult to control the refractive index (retardation value) (see, for example, Patent Documents 1 to 3). Here, nx indicates the refractive index in the fast axis direction (the direction having a minimum refractive index) in the film plane, ny indicates the refractive index in the slow axis direction (the direction having a maximum refractive index) in the film plane, and nz indicates the refractive index outside the film plane (thickness direction).

In addition, a cellulose-based resin film is generally produced by a solvent casting method, and the cellulose-based resin film deposited by a casting method has an out-of-plane retardation (Rth) of about 40 nm in the film thickness direction and therefore, raises a problem, such as occurrence of a color shift in an IPS-mode liquid crystal display, etc. Here, the out-of-plane retardation (Rth) is a retardation value represented by the following formula:

$$Rth=[(nx+ny)/2-nz] \times d$$

(wherein nx represents the refractive index in the fast axis direction in the film plane, ny represents the refractive index in the slow axis direction in the film plane, nz represents the refractive index outside the film plane, and d represents the film thickness).

A retardation film composed of a fumaric acid ester-based resin has also been proposed (see, for example, Patent Document 4).

However, the three-dimensional indices of a stretched film composed of a fumaric acid ester-based resin are nz>ny>nx and, for example, lamination to another optical compensation film, etc. is needed for obtaining an optical compensation film exhibiting the above-described three-dimensional refractive indices.

As for the optical compensation film exhibiting the above-described three-dimensional refractive indices, a resin composition and an optical compensation film using the same have been proposed (see, for example, Patent Document 5).

Here, the retardation film is generally used also as an antireflection layer of a reflective liquid crystal display device, a touch panel or an organic EL and in these uses, a retardation film giving a larger retardation in the longer wavelength region (hereinafter, referred to as "reverse wavelength dispersion film") is required, but Patent Document 5 is silent on use as a reverse wavelength dispersion film.

In the case of using a reverse wavelength dispersion film as the antireflection film, the retardation is preferably about ¼ of the measured wavelength λ, and the ratio Re(450)/Re(550) between the retardation at 450 nm and the retardation at 550 nm is preferably close to 0.81. In addition, with the consideration of thinning of the display device, the reverse wavelength dispersion film is also required to be thin. To meet these requirements, various retardation films are being developed.

As such a retardation film, a retardation plate having a reverse wavelength dispersion property, obtained by the blending of a polymer having positive intrinsic birefringence and a polymer having negative intrinsic birefringence, is disclosed (see, for example, Patent Document 6). In this patent document, a norbornene-based polymer as a polymer having positive intrinsic birefringence, a styrene-maleic anhydride copolymer as a polymer having negative intrinsic birefringence, and a composition obtained by blending these polymers are disclosed, but in the retardation plate using the composition, Re and Nz do not satisfy the relationship preferred as the retardation characteristics of a retardation film.

BACKGROUND ART DOCUMENT

Patent Document

Patent Document 1: Japanese Patent No. 2818983
Patent Document 2: JP-A-5-297223 (the term "JP-A" as used herein means an "unexamined published Japanese patent application")
Patent Document 3: JP-A-5-323120
Patent Document 4: JP-A-2008-64817
Patent Document 5: JP-A-2013-28741
Patent Document 6: JP-A-2001-337222

SUMMARY OF INVENTION

Problem that Invention is to Solve

The present invention has been made by taking into account the above-described problems, and an object of the present invention is to provide a resin composition suitable for an optical compensation film, an optical compensation film using the same, which is excellent in the retardation characteristics and wavelength dispersion characteristics, and a production method thereof.

Means for Solving Problem

As a result of intensive studies to solve the problems above, the present inventors have found that those problems can be solved by a resin composition containing a cellulose-based resin that is a specific cellulose ether, and a specific fumaric acid ester polymer, an optical compensation film using the same, and a production method thereof. The present invention has been accomplished based on this finding.

That is, the present invention provides a resin composition containing from 30 to 99 wt % of a cellulose-based resin as a cellulose ether, represented by the following formula (1), and from 70 to 1 wt % of a fumaric acid ester polymer represented by the following formula (2), an optical compensation film using the same, and a production method thereof.

[Chem. 1]

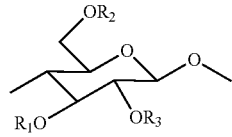

(1)

(wherein each of $R_1$, $R_2$ and $R_3$ independently represents a substituent having a carbon number of 1 to 12).

[Chem. 2]

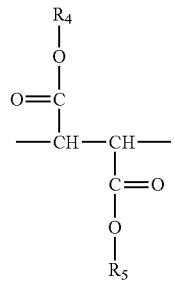

(2)

(wherein $R_4$ and $R_5$ represent an alkyl group having a carbon number of 1 to 12).

Effects of Invention

The optical compensation film using the resin composition of the present invention is a thin film exhibiting specific retardation characteristics and specific wavelength dispersion characteristics and therefore, is useful as an optical compensation film or an antireflection film for a liquid crystal display.

MODE FOR CARRYING OUT INVENTION

The present invention is described in detail below.

The resin composition of the present invention contains from 30 to 99 wt % of a cellulose-based resin as a cellulose ether, represented by the following formula (1), and from 70 to 1 wt % of a fumaric acid ester polymer containing 30 mol % or more of a fumaric acid diester residue unit represented by the following formula (2):

[Chem. 3]

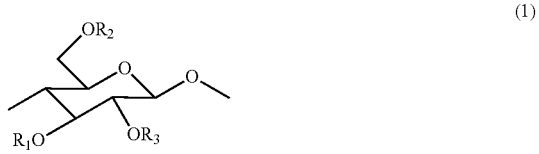

(1)

(wherein each of $R_1$, $R_2$ and $R_3$ independently represents a substituent having a carbon number of 1 to 12);

[Chem. 4]

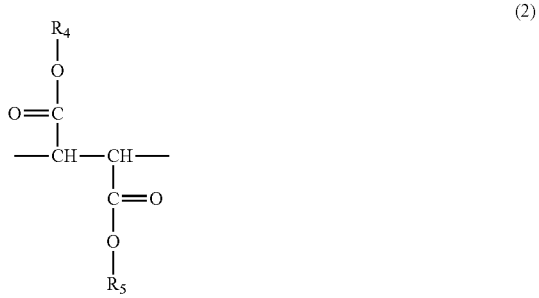

(2)

(wherein $R_4$ and $R_5$ represent an alkyl group having a carbon number of 1 to 12).

By virtue of containing a cellulose-based resin that is represented by formula (1) and is a cellulose ether, the resin composition of the present invention can have excellent compatibility with a fumaric acid ester polymer, a large in-plane retardation Re and furthermore, superior stretchability.

As the cellulose ether for use in the present invention, one ether or two or more ethers may be contained.

In the cellulose ether for use in the present invention, the number average molecular weight (Mn) as determined in terms of standard polystyrene from an elution curve measured by gel permeation chromatography (GPC) is, in view of excellent mechanical properties and excellent moldability at the time of film formation, preferably from $1 \times 10^3$ to $1 \times 10^6$, more preferably from $5 \times 10^3$ to $2 \times 10^5$.

The cellulose ether for use in the present invention is a polymer obtained by linearly polymerizing β-glucose units and is a polymer in which hydroxyl groups at the 2-position, 3-position and 6-position of the glucose unit are partially or entirely etherified. The cellulose ether for use in the present invention includes, for example, an alkyl cellulose such as methyl cellulose, ethyl cellulose and propyl cellulose; a hydroxyalkyl cellulose such as hydroxyethyl cellulose and hydroxypropyl cellulose; an aralkyl cellulose such as benzyl cellulose and trityl cellulose; a cyanoalkyl cellulose such as cyan ethyl cellulose; a carboxyalkyl cellulose such as carboxymethyl cellulose and carboxyethyl cellulose; a carboxyalkylalkyl cellulose such as carboxymethylmethyl cellulose and carboxymethylethyl cellulose; and an aminoalkyl cellulose such as aminoethyl cellulose.

The substitution degree of substituting, though an oxygen atom, the hydroxyl group of cellulose in the cellulose ether means a ratio at which the hydroxyl group of cellulose is etherified (in the case of 100% etherification, the substitution degree is 1) at each of the 2-position, 3-position and 6-position, and the total degree of substitution DS of an ether group is preferably from 1.5 to 3.0 (1.5≤DS≤3.0), more preferably from 1.8 to 2.8.

In view of solubility and compatibility, the cellulose ether for use in the present invention preferably has a substituent having a carbon number of 1 to 12. The substituent having a carbon number of 1 to 12 includes, for example, a methyl group, an ethyl group, a propyl group, a butyl group, a pentyl group, a hexyl group, a heptyl group, an octyl group, a decanyl group, a dodecanyl group, an isobutyl group, a tert-butyl group, a cyclohexyl group, a phenonyl group, a benzyl group, and a naphthyl group. Among these, in view of solubility and compatibility, a methyl group, an ethyl group, a propyl group, a butyl group and a pentyl group, which are an alkyl group having a carbon number of 1 to 5, are preferred. The cellulose ether for use in the present invention may have only one kind of an ether group or two or more kinds of ether groups.

The cellulose ether is generally synthesized by alkali-decomposing cellulose pulp obtained from wood or cotton and etherifying the alkali-decomposed cellulose pulp. As the alkali, for example, a hydroxide of an alkali metal such as lithium, potassium and sodium, or ammonia may be used. The alkalis above are generally used in the form of an aqueous solution. The alkalized cellulose pulp is then put into contact with an etherifying agent used according to the type of the cellulose ether, and thereby etherified. The etherifying agent includes, for example, an alkyl halide such as methyl chloride and ethyl chloride; an aralkyl halide such as benzyl chloride and trityl chloride; a halocarboxylic acid such as monochloroacetic acid and monochloropropionic acid; and an alkylene oxide such as ethylene oxide, propylene oxide and butylene oxide. One of these etherifying agents may be used alone, or two or more thereof may be used in combination.

If desired, after the completion of reaction, a depolymerization treatment with hydrogen chloride, hydrogen bromide, hydrochloric acid, sulfuric acid, etc. may be performed so as to adjust the viscosity.

The fumaric acid ester polymer contained in the composition of the present invention (hereinafter, referred to as the fumaric acid ester polymer) is not particularly limited as long as it is a polymer containing 30 mol % or more of a fumaric acid diester residue unit represented by formula (2). If the content of the fumaric acid diester residue unit is less than 30 mol %, the retardation developability and polymerizability are reduced.

$R_4$ and $R_5$ which are an ester substituent of the fumaric acid diester residue unit in the fumaric acid ester polymer are an alkyl group having a carbon number of 1 to 12, and examples thereof include a methyl group, an ethyl group, a propyl group, an isopropyl group, an n-butyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. The fumaric acid diester residue unit represented by formula (2) includes, for example, a dimethyl fumarate residue unit, a diethyl fumarate residue unit, an ethyl-isopropyl fumarate residue unit, an ethyl tert-butyl fumarate residue unit, a di-n-propyl fumarate residue unit, a diisopropyl fumarate residue unit, an isopropyl-tert-butyl fumarate residue unit, a di-n-butyl fumarate residue unit, a di-s-butyl fumarate residue unit, a di-tert-butyl fumarate residue unit, a di-n-pentyl fumarate residue unit, a di-s-pentyl fumarate residue unit, a di-tert-pentyl fumarate residue unit, a di-n-hexyl fumarate residue unit, a di-s-hexyl fumarate residue unit, a di-tert-hexyl fumarate residue unit, a di-2-ethylhexyl fumarate residue unit, a dicyclopropyl fumarate residue unit, a dicyclopentyl fumarate residue unit, and a dicyclohexyl fumarate residue unit. Among these, in view of polymerizability and retardation developability, a diethyl fumarate residue unit, a diisopropyl fumarate residue unit, a di-tert-butyl fumarate residue unit, an ethyl-isopropyl fumarate residue unit, an ethyl-tert-butyl fumarate residue unit, and an isopropyl-tert-butyl fumarate residue unit are preferred, and a diethyl fumarate residue unit, a diisopropyl fumarate residue unit and a di-tert-butyl fumarate residue unit are more preferred.

From the standpoint that the polymerizability and compatibility are particularly excellent, the fumaric acid ester polymer for use in the present invention is preferably a fumaric acid ester polymer containing form 30 to 95 mol % of the fumaric acid diester residue unit and from 70 to 5 mol % of a fumaric monoester residue unit represented by the following formula (3):

[Chem. 5]

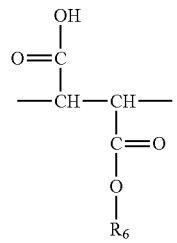

(3)

(wherein $R_6$ represents an alkyl group having a carbon number of 1 to 12).

In the case where the fumaric acid diester residue unit is a diethyl fumarate residue, the fumaric acid ester polymer for use in the present invention becomes excellent particularly in the polymerizability and compatibility even without containing a fumaric monoester residue unit and therefore, from 30 to 100 mol % of a diethyl fumarate residue unit and from 70 to 0 mol % of a fumaric acid monoester residue unit represented by formula (3) are preferred. In addition, when the fumaric acid diester residue unit is a diethyl fumarate residue, from 30 to 95 mol % of a diethyl fumarate residue unit and from 70 to 5 mol % of a fumaric acid monoester residue unit represented by formula (3) are more preferred, because a fumaric acid ester polymer more excellent in the compatibility is obtained.

$R_6$ that is an ester substituent of the fumaric acid monoester residue unit in the fumaric acid ester polymer is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Among these, in view of compatibility with the cellulose ether, a methyl group, an ethyl group, a propyl group and a butyl group, which are an alkyl group having a carbon number of 1 to 4, are preferred. The fumaric acid monoester residue unit represented by formula (3) includes, for example, a monomethyl fumarate residue unit, a monoethyl fumarate residue unit, a mono-n-propyl fumarate residue unit, a monoisopropyl fumarate residue unit, a mono-n-butyl fumarate residue unit, a mono-s-butyl fumarate residue unit, a mono-tert-butyl fumarate residue unit, a mono-n-pentyl fumarate residue unit, a mono-s-pentyl fumarate residue unit, a mono-tert-pentyl fumarate residue unit, a mono-n-hexyl fumarate residue unit, a mono-s-hexyl fumarate residue unit, a mono-tert-hexyl fumarate residue unit, a mono-2-ethylhexyl fumarate residue unit, a monocyclopropyl fumarate residue unit, a monocyclopentyl fumarate residue unit, and a monocyclohexyl fumarate residue unit. Among these, in view of good compatibility with the cellulose ether, a fumaric acid monoester residue unit selected from a monomethyl fumarate residue unit, a monoethyl fumarate residue unit, a monoisopropyl fumarate residue unit, a mono-n-propyl fumarate residue unit, a mono-n-butyl fumarate residue unit, a mono-s-butyl fumarate residue unit and a mono-tert-butyl residue unit is preferred.

In view of retardation characteristics and compatibility, a fumaric acid ester polymer containing from 70 to 99.5 mol % of a fumaric acid diester residue unit represented by formula (2) and from 30 to 0.5 mol % of a residue unit selected from the group consisting of an acrylic acid ester residue unit represented by the following formula (4), a methacrylic acid ester residue unit represented by the following formula (5), an acrylic acid amide residue unit represented by the following formula (6), and a methacrylic acid amide residue unit represented by the following formula (7) is also preferably used as the fumaric acid ester polymer of the present invention.

[Chem. 6]

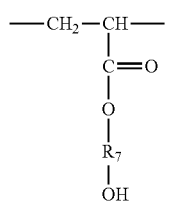

(4)

[Chem. 7]

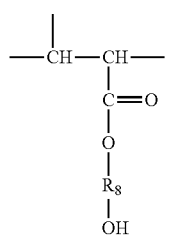

(5)

[Chem. 8]

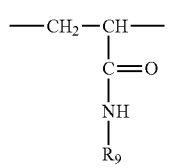

(6)

-continued

[Chem. 9]

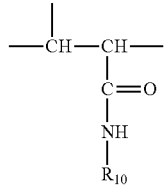

(7)

(wherein each of $R_7$, $R_8$, $R_9$ and $R_{10}$ independently represents an alkyl group having a carbon number of 1 to 12, an alkylene group or an ether group).

When the monomers responsible for fumaric acid ester residue units are assumed to account for 100 mol %, the fumaric acid ester polymer may contain from 0 to 60 mol % of a residue unit of a monomer copolymerizable with fumaric acid esters.

The residue unit of a monomer copolymerizable with fumaric acid esters includes, for example, one member or two or more members selected from a residue of styrenes, such as styrene residue and α-methylstyrene residue; an acrylic acid residue; a residue of acrylic acid esters, such as methyl acrylate residue, ethyl acrylate residue and butyl acrylate residue; a residue of methacrylic acid esters, such as methyl methacrylate residue, ethyl methacrylate residue and butyl methacrylate residue; a residue of vinyl esters, such as vinyl acetate residue and vinyl propionate residue; a vinyl ether residue such as methyl vinyl ether residue, ethyl vinyl ether residue and butyl vinyl ether residue; an N-substituted maleimide residue such as N-methylmaleimide residue, N-cyclohexylmaleimide residue and N-phenylmaleimide residue; an acrylonitrile residue; a methacrylonitrile residue; a cinnamic acid residue; a cinnamic acid ester residue such as methyl cinnamate residue, ethyl cinnamate residue and isopropyl cinnamate residue; a residue of olefins, such as ethylene residue and propylene residue; a vinylpyrrolidone residue; and a vinylpyridine residue.

In the fumaric acid ester polymer, the number average molecular weight (Mn) as determined in terms of standard polystyrene from an elution curve measured by gel permeation chromatography (GPC) is preferably from $1 \times 10^3$ to $5 \times 10^6$, and in view of excellent mechanical properties and excellent moldability at the time of film formation, more preferably from $5 \times 10^3$ to $2 \times 10^5$.

The compositional proportions of the cellulose-based resin as a cellulose ether and the fumaric acid ester polymer in the resin composition of the present invention are from 30 to 99 wt % of the cellulose-based resin as a cellulose ether and from 70 to 1 wt % of the fumaric acid ester polymer. If the cellulose ether is less than 30 wt % (if the fumaric acid ester polymer exceeds 70 wt %) or the cellulose ether exceeds 99 wt % (if the fumaric acid ester polymer is less than 1 wt %), control of the retardation is difficult. The compositional proportions are preferably from 30 to 90 wt % of the cellulose ether and from 70 to 10 wt % of the fumaric acid ester polymer, more preferably from 40 to 80 wt % of the cellulose ether and from 60 to 20 wt % of the fumaric acid ester polymer.

As for the production method of the fumaric acid ester polymer, the polymer may be produced by any method as long as the fumaric acid ester polymer is obtained. In the case where the fumaric acid ester polymer contains a fumaric acid diester residue unit and a fumaric acid monoester residue unit, for example, radical polymerization of a fumaric acid diester and fumaric acid monoesters is performed by using, depending on the case, a monomer copolymerizable with the fumaric acid diester and fumaric acid monoesters in combination, whereby the polymer can be produced. At this time, the fumaric acid monoesters copolymerizable with the fumaric acid diester include, for example, monomethyl fumarate, monoethyl fumarate, mono-n-propyl fumarate, monoisopropyl fumarate, mono-n-butyl fumarate, mono-s-butyl fumarate, mono-tert-butyl fumarate, mono-s-pentyl fumarate, mono-tert-pentyl fumarate, mono-s-hexyl fumarate, mono-tert-hexyl fumarate, mono-2-ethylhexyl fumarate, monocyclopropyl fumarate, monocyclopentyl fumarate, and monocyclohexyl fumarate. The monomer copolymerizable with the fumaric acid diester and fumaric acid monoesters includes, for example, one member or two or more members selected from styrenes such as styrene and α-methylstyrene; acrylic acid; acrylic acid esters such as methyl acrylate, ethyl acrylate and butyl acrylate; methacrylic acid esters such as methyl methacrylate, ethyl methacrylate and butyl methacrylate; vinyl esters such as vinyl acetate and vinyl propionate; acrylonitrile; methacrylonitrile; olefins such as ethylene and propylene; vinyl pyrrolidone; and vinylpyridine.

As the method for radical polymerization, for example, any of a bulk polymerization method, a solution polymerization method, a suspension polymerization method, a precipitation polymerization method, and an emulsion polymerization method can be employed.

The polymerization initiator at the time of radical polymerization includes, for example, an organic peroxide such as benzoyl peroxide, lauryl peroxide, octanoyl peroxide, acetyl peroxide, di-tert-butyl peroxide, tert-butyl cumyl peroxide and dicumyl peroxide; and an azo-based initiator such as 2,2'-azobis(2,4-dimethylvaleronitrile), 2,2'-azobis(2-butyronitrile), 2,2'-azobisisobutyronitrile, dimethyl 2,2'-azobisisobutyrate and 1,1'-azobis(cyclohexane-1-carbonitrile).

The solvent usable in the solution polymerization method or precipitation polymerization method is not particularly limited and includes, for example, an aromatic solvent such as benzene, toluene and xylene; an alcohol-based solvent such as methanol, ethanol, propyl alcohol and butyl alcohol; cyclohexane; dioxane; tetrahydrofuran; acetone; methyl ethyl ketone; dimethyl formamide; isopropyl acetate; and a mixed solvent thereof.

The polymerization temperature at the time of radical polymerization can be appropriately set according to the decomposition temperature of the polymerization initiator, and in general, the polymerization is preferably performed at 30 to 150° C.

The resin composition of the present invention may contain an antioxidant so as to enhance the thermal stability. The antioxidant includes, for example, a hindered phenol-based antioxidant, a phosphorus-based antioxidant, a sulfur-based antioxidant, a lactone-based antioxidant, an amine-based antioxidant, a hydroxylamine-based antioxidant, a vitamin E-based antioxidant, and other antioxidants. One of these antioxidants may be used alone, or two or more thereof may be used in combination.

The resin composition of the present invention may contain a hindered amine-based light stabilizer or an ultraviolet absorber so as to enhance the weather resistance. The ultraviolet absorber includes, for example, benzotriazole, benzophenone, triazine, and benzoate.

In the resin composition of the present invention, a compound known as a so-called plasticizer may be added for the purpose of improving the mechanical property, imparting flexibility, imparting water absorption resistance, reducing the water vapor permeability, and adjusting the retardation, and the plasticizer includes, for example, a phosphoric acid ester and a carboxylic acid ester. In addition, an acrylic polymer, etc. are also used. The phosphoric acid ester includes, for example, triphenyl phosphate, tricresyl phosphate, and phenyldiphenyl phosphate. The carboxylic acid ester includes a phthalic acid ester, a citric acid ester, etc. The phthalic acid ester includes, for example, dimethyl phthalate, diethyl phthalate, dicyclohexyl phthalate, dioctyl phthalate, and diethylhexyl phthalate, and the citric acid ester includes acetyl triethyl citrate, acetyl tributyl citrate, etc. Other examples include butyl oleate, methyl acetyl ricinoleate, dibutyl sebacate, triacetin, and trimethylolpropane tribenzoate. An alkylphthalylalkyl glycolate is also used for this purpose. The alkyl of the alkylphthalyl alkylglycolate is an alkyl group having 1 to 8 carbon atoms. The alkylphthalyl alkylglycolate includes methylphthalyl ethylglycolate, ethylphthalyl ethylglycolate, propylphthalyl propylglycolate, butylphthalyl butylglycolate, octylphthalyl octylglycolate, methylphthalyl ethylglycolate, ethylphthalyl methylglycolate, ethylphthalyl propylglycolate, propylphthalyl ethylglycolate, methylphthalyl propylglycolate, methylphthalyl butylglycolate, ethylphthalyl butylglycolate, butylphthalyl methylglycolate, butylphthalyl ethylglycolate, propylphthalyl butylglycolate, butylphthalyl propylglycolate, methylphthalyl octylglycolate, ethylphthalyl octylglycolate, octylphthalyl methylglycolate, octylphthalyl ethylglycolate, etc. Two or more of these plasticizers may be mixed and used.

The resin composition of the present invention may contain an additive having an aromatic hydrocarbon ring or aromatic heterocyclic ring for the purpose of adjusting the retardation. The birefringence Δn represented by the following formula (A) of the additive used for the purpose of adjusting the retardation is not particularly limited, but from the standpoint that an optical compensation film excellent in the optical properties is obtained, the birefringence is preferably 0.05 or more, more preferably from 0.05 to 0.5, still more preferably from 0.1 to 0.5. The Δn of the additive can be determined by a molecular orbital calculation.

$$\Delta n = n_y - n_x \quad (A)$$

(wherein nx represents the refractive index in the fast axis direction of the additive molecule, and ny represents the refractive index in the slow axis direction of the additive molecule).

In the case of incorporating an additive having an aromatic hydrocarbon ring or an aromatic heterocyclic ring into the resin composition of the present invention, the additive having an aromatic hydrocarbon ring or aromatic heterocyclic ring in the resin composition of the present invention is not particularly limited in the number of aromatic hydrocarbon rings or aromatic heterocyclic rings in the molecule, but from the standpoint that an optical compensation film excellent in the optical properties is obtained, the number of such rings is preferably from 1 to 12, more preferably from 1 to 8. The aromatic hydrocarbon ring includes, for example, a 5-membered ring, a 6-membered ring, a 7-membered ring, and a condensed ring composed of two or more aromatic rings, and the aromatic heterocyclic ring includes, for example, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring.

The aromatic hydrocarbon ring or aromatic heterocyclic ring may have a substituent, and the substituent includes, for example, a hydroxyl group, an ether group, a carbonyl group, an ester group, a carboxylic acid residue, an amino group, an imino group, an amido group, an imido group, a cyano group, a nitro group, a sulfonyl group, a sulfonic acid residue, a phosphonyl group, and a phosphonic acid residue.

The additive having an aromatic hydrocarbon ring or aromatic heterocyclic ring for use in the present invention includes, for example, a phosphoric acid ester-based compound such as tricresyl phosphate, trixylenyl phosphate, triphenyl phosphate, 2-ethylhexyldiphenyl phosphate, cresyldiphenyl phosphate and bisphenol A bis(diphenyl phosphate); a phthalic acid ester-based compound such as dimethyl phthalate, diethyl phthalate, dibutyl phthalate, dihexyl phthalate, di-normal-octyl phthalate, 2-ethylhexyl phthalate, diisooctyl phthalate, dicapryl phthalate, dinonyl phthalate, diisononyl phthalate, didecyl phthalate and diisodecyl phthalate; a trimellitic acid ester-based compound such as tributyl trimellitate, tri-normal-hexyl trimellitate, tri(2-ethylhexyl)trimellitate, tri-normal-octyl trimellitate, tri-isooctyl trimellitate and tri-isodecyl trimellitate; a pyromellitic acid ester-based compound such as tri(2-ethylhexyl)pyromellitate, tetrabutyl pyromellitate, tetra-normal-hexyl pyromellitate, tetra(2-ethylhexyl)pyromellitate, tetra-normal-octyl pyromellitate, tetra-isooctyl pyromellitate and tetra-isodecyl pyromellitate; a benzoic acid ester-based compound such as ethyl benzoate, isopropyl benzoate and ethyl paraoxybenzoate; a salicylic acid ester-based compound such as phenyl salicylate, p-octylphenyl salicylate and p-tert-butylphenyl salicylate; a glycolic acid ester-based compound such as methylphthalyl ethylglycolate, ethylphthalyl ethylglycolate and butylphthalyl butylglycolate; a benzotriazole-based compound such as 2-(2'-hydroxy-5'-tert-butylphenyl)benzotriazole and 2-(2'-hydroxy-3',5'-di-tert-butylphenyl)benzotriazole; a benzophenone-based compound such as 2-hydroxy-4-methoxybenzophenone, 2,2'-dihydroxy-4-methoxybenzophenone, 2,4-dihydroxybenzophenone, 2,2', 4,4'-tetrahydroxybenzophenone and 2-hydroxy-4-methoxy-5-sulfobenzophenone; a sulfonamide-based compound such as N-benzenesulfonamide; and a triazine-based compound such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine and 2,4-diphenyl-(2-hydroxy-4-butoxyphenyl)-1,3,5-triazine. Preferred are tricresyl phosphate, 2-ethylhexyldiphenyl phosphate, 2-hydroxy-4-methoxybenzophenone, 2,2',4,4'-tetrahydroxybenzophenone, etc. As needed, one of these may be used, or two or more thereof may be used in combination.

In the case of incorporating an additive having an aromatic hydrocarbon ring or an aromatic heterocyclic ring into the resin composition of the present invention, in view of optical properties and mechanical properties, the proportion of the additive having an aromatic hydrocarbon ring or aromatic heterocyclic ring in the resin composition of the present invention is from 0.01 to 30 wt % (the resin component above: from 70 to 99.99 wt %), preferably from 0.01 to 20 wt %, more preferably from 0.01 to 15 wt %.

The resin composition of the present invention may contain other polymers, a surfactant, a polymer electrolyte, an electroconductive complex, a pigment, a dye, an antistatic agent, an antiblocking agent, a lubricant, etc., as long as the gist of the invention is observed.

The resin composition of the present invention can be obtained by blending a cellulose ether and a fumaric acid ester polymer.

As for the blending method, a melt blending method, a solution blending method, or other methods may be used. The melt blending method when incorporating an additive having an aromatic hydrocarbon ring or an aromatic heterocyclic ring into the resin composition of the present invention is a method where the resins and the additive having an aromatic hydrocarbon ring or an aromatic heterocyclic ring are melted by heating and kneaded, thereby producing the resin composition. The solution blending method is a method where the resins and the additive having an aromatic hydrocarbon ring or an aromatic heterocyclic ring are dissolved in a solvent and blended. The solvent which can be used for the solution blending includes, for example, a chlorine-based solvent such as methylene chloride and chloroform; an aromatic solvent such as toluene and xylene; acetone; methyl ethyl ketone; methyl isobutyl ketone; an alcohol solvent such as methanol, ethanol and propanol; an ether solvent such as dioxane and tetrahydrofuran; dimethylformamide; and N-methylpyrrolidone. It is also possible to dissolve respective resins and the additive having an aromatic hydrocarbon ring or an aromatic heterocyclic ring in solvents and thereafter, blend the solutions. Furthermore, it is also possible to knead powders, pellets, etc. of respective resins and then dissolve the kneaded product in a solvent. The obtained blend resin solution may be charged into a poor solvent to precipitate the resin composition, or the blend resin solution may be directly used for the production of an optical compensation film.

In view of handleability of the film and suitability for thinning of an optical member, the optical compensation film using the resin composition of the present invention preferably has a thickness of 5 to 200 μm, more preferably from 10 to 100 μm, still more preferably from 20 to 80 μm, and most preferably from 20 to 60 μm.

The retardation characteristics of the optical compensation film using the resin composition of the present invention vary depending on the intended optical compensation film and, for example, include: 1) the in-plane retardation (Re) represented by the following expression (1) is preferably from 80 to 300 nm, more preferably from 100 to 300 nm, still more preferably from 100 to 280 nm, and the Nz coefficient represented by the following expression (2) is preferably from 0.35 to 0.65, more preferably from 0.45 to 0.55; 2) the in-plane retardation (Re) is preferably from 50 to 200 nm, more preferably from 80 to 160 nm, and the Nz coefficient is preferably from −0.2 to 0.2, more preferably from −0.1 to 0.1; and 3) the in-plane retardation (Re) is preferably from 0 to 20 nm, more preferably from 0 to 5 nm, and the out-of-plane retardation (Rth) represented by the following expression (3) is preferably from −150 to 20 nm, more preferably from −150 to 10 nm, still more preferably from −120 to 0 nm. The retardation characteristics here are measured using a full-automatic birefringence analyzer (trade name: KOBRA-21ADH, manufactured by Oji Scientific Instruments) under the condition of a measurement wavelength of 589 nm.

These optical compensation films have retardation characteristics that are difficult to develop in an optical compensation film composed of a conventional cellulose-based resin.

$$Re = (ny - nx) \times d \quad (1)$$

$$Nz = (ny - nz)/(ny - nx) \quad (2)$$

$$Rth = [(nx + ny)/2 - nz] \times d \quad (3)$$

(wherein nx represents the refractive index in the fast axis direction in the film plane, ny represents the refractive index in the slow axis direction in the film plane, nz represents the refractive index outside the film plane, and d represents the film thickness).

In order to suppress a color shift, the wavelength dispersion characteristics of the optical film of the present invention is preferably 0.60<Re(450)/Re(550)<1.05, more preferably 0.61<Re(450)/Re(550)<1.02, still more preferably 0.61<Re(450)/Re(550)<1.00.

In the case of using the cellulose ether of the present invention, the cellulose ether can by itself provide an optical film having low wavelength dispersion. A resin composition in which a fumaric acid ester polymer exhibiting negative birefringence in the stretching direction is blended with the film above can generally provide an optical film exhibiting reverse wavelength dispersion property.

It is difficult for an optical compensation film using a conventional cellulose-based resin to simultaneously satisfy the retardation characteristics and wavelength dispersion characteristics above, and the optical compensation film using the resin composition of the present invention is characterized by satisfying these characteristics at the same time.

In the optical compensation film of the present invention, from the standpoint of enhancing the luminance, the light transmittance is preferably 85% or more, more preferably 90% or more.

In the optical compensation film of the present invention, from the standpoint of enhancing the contrast, the haze is preferably 1% or less, more preferably 0.5% or less.

As for the production method of the optical compensation film using the resin composition of the present invention, any method may be used as long as the optical compensation film of the present invention can be produced, but production by a solution casting method is preferred, because an optical compensation film excellent in the optical properties, heat resistance, surface characteristics, etc. is obtained. Here, the solution casting method is a method of casting a resin solution (generally called a dope) on a supporting substrate and evaporating the solvent by heating to obtain an optical compensation film. As the method for casting, for example, a T-die method, a doctor blade method, a bar coater method, a roll coater method, and a lip coater method are used, and in industry, a method of continuously extruding a dope from a die on a belt-shaped or drum-shaped supporting substrate is commonly employed. The supporting substrate used includes, for example, a glass substrate, a metal substrate such as stainless steel and ferrotype, and a plastic substrate such as polyethylene terephthalate. In order to industrially produce a substrate with highly excellent surface property and optical homogeneity by continuous film formation, a metal substrate having a mirror-finished surface is preferably used. At the time of producing an optical compensation film excellent in the thickness precision and surface smoothness by a solution casting method, the viscosity of the resin solution is a very important factor, and the viscosity of the resin solution depends on the concentration or molecular weight of the resin or the type of the solvent.

The resin solution at the time of the production of the optical compensation film using the resin composition of the present invention is prepared by dissolving the cellulose ether and the fumaric acid ester polymer in a solvent. The viscosity of the resin solution can be adjusted by the molecular weight of the polymer, the concentration of the polymer, or the type of the solvent. The viscosity of the resin solution is not particularly limited but in order to more facilitate the film coatability, the viscosity is preferably from 100 to 10,000 cps, more preferably from 300 to 5,000 cps, still more preferably from 500 to 3,000 cps.

The production method of the optical compensation film using the resin composition of the present invention includes, for example, dissolving, in a solvent, a resin composition including from 30 to 99 wt % of a cellulose-based resin as a cellulose ether, represented by the following formula (1), and from 70 to 1 wt % of a fumaric acid ester polymer containing 30 mol % or more of a fumaric acid diester residue unit represented by the following formula (2), casting the obtained resin solution on a base material, and after drying, separating the resulting film from the base material:

[Chem. 10]

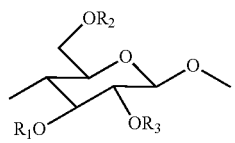

(1)

(wherein each of $R_1$, $R_2$ and $R_3$ independently represents a substituent having a carbon number of 1 to 12);

[Chem. 11]

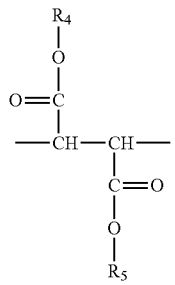

(wherein $R_4$ and $R_5$ represent an alkyl group having a carbon number of 1 to 12).

The optical compensation film obtained using the resin composition of the present invention is preferably subjected to uniaxial stretching or unbalanced biaxial stretching so as to develop the in-plane retardation (Re). As the method for stretching the optical compensation film, for example, a longitudinal uniaxial stretching method by roll stretching, a transverse uniaxial stretching method by tenter stretching, and a combination thereof, that is, an unbalanced sequential biaxial stretching method or an unbalanced simultaneous biaxial stretching method, may be used. Furthermore, in the present invention, the retardation characteristics can be developed without using a special stretching method of performing the stretching under the action of a shrinking force of a heat-shrinkable film.

In view of ease of stretching and suitability for thinning of an optical member, the thickness of the optical compensation film at the time of stretching is preferably from 10 to 200 more preferably from 30 to 150 μm, still more preferably from 30 to 100 μm.

The stretching temperature is not particularly limited but is preferably from 50 to 200° C., more preferably from 100 to 180° C., because good retardation characteristics are obtained. The stretch ratio in uniaxial stretching is not particularly limited but is preferably from 1.05 to 4.0 times, more preferably from 1.1 to 3.5 times, because good retardation characteristics are obtained. The stretch ratio in unbalanced biaxial stretching is not particularly limited, but the stretch ratio in the length direction is preferably from 1.05 to 4.0 times, more preferably from 1.1 to 3.5 times, because an optical compensation film excellent in the optical properties is obtained, and the stretch ratio in the width direction is preferably from 1.01 to 1.2 times, more preferably from 1.05 to 1.1 times, because an optical compensation film excellent in the optical properties is obtained. The in-plane retardation (Re) can be controlled by the stretching temperature and the stretch ratio.

The optical compensation film using the resin composition of the present invention can be laminated, if desired, to a film containing other resins. Other resins include, for example, polyethersulfone, polyarylate, polyethylene terephthalate, polynaphthalene terephthalate, polycarbonate, cyclic polyolefin, a maleimide-based resin, a fluororesin, and polyimide. In addition, a hardcoat layer or a gas barrier layer may also be stacked thereon.

EXAMPLES

The present invention is described below by referring to Examples, but the present invention is not limited to these Examples.

Incidentally, various physical properties indicated in Examples were measured by the following methods.

<Analysis of Polymer>

A structural analysis of the polymer was performed using a nuclear magnetic resonance analyzer (trade name: JNM-GX270, manufactured by JEOL Ltd.), and the structure was determined by proton nuclear magnetic resonance spectroscopy ($^1$H-NMR) spectrum analysis.

<Measurement of Number Average Molecular Weight>

Using a gel permeation chromatograph (GPC) (trade name: C0-8011 (equipped with column $GMH_{HR}$-H), manufactured by Tosoh Corp.) and using tetrahydrofuran or dimethylformamide as a solvent, the molecular weight was measured at 40° C. and determined as a value in terms of standard polystyrene.

<Measurements of Light Transmittance and Haze of Optical Compensation Film>

The light transmittance and haze of the film produced were measured using a haze meter (trade name: NDH2000, manufactured by Nippon Denshoku Industries Co., Ltd.), and the light transmittance and the haze were measured in conformity with JIS K 7361-1 (1997) and JIS-K 7136 (2000), respectively.

<Measurement of Retardation Characteristics>

The retardation characteristics of the optical compensation film were measured using a sample inclination-type automatic birefringence analyzer (trade name: KOBRA-WR, manufactured by Oji Scientific Instruments) and using light with a wavelength of 589 nm.

<Measurement of Wavelength Dispersion Characteristics>

The wavelength dispersion characteristics of the optical compensation film were measured as a ratio between the retardation Re(450) of light with a wavelength of 450 nm and the retardation Re(550) of light with a wavelength of 550 nm by using a sample inclination-type automatic birefringence analyzer (trade name: KOBRA-WR, manufactured by Oji Scientific Instruments).

Synthesis Example 1 (Synthesis of diethyl fumarate polymer)

A 75 mL-volume glass ampoule was charged with 50 g of diethyl fumarate and 0.45 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 72 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 26 g of a diethyl fumarate polymer. The obtained polymer had a number average molecular weight of 25,000.

Synthesis Example 2 (Synthesis of diethyl fumarate/monoethyl fumarate Copolymer)

A 75 mL-volume glass ampoule was charged with 48 g of diethyl fumarate, 2.1 g of monoethyl fumarate and 0.45 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 72 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 22 g of a diethyl fumarate/monoethyl fumarate copolymer. The obtained polymer had a number average molecular weight of 23,000 and was composed of 95 mol % of diethyl fumarate residue unit and 5 mol % of monoethyl fumarate residue unit.

Synthesis Example 3 (Synthesis of diethyl fumarate/monoethyl fumarate Copolymer)

A 75 mL-volume glass ampoule was charged with 46 g of diethyl fumarate, 4.3 g of monoethyl fumarate and 0.47 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 72 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 21 g of a diethyl fumarate/monoethyl fumarate copolymer. The obtained polymer had a number average molecular weight of 20,000 and was composed of 90 mol % of diethyl fumarate residue unit and 10 mol % of monoethyl fumarate residue unit.

Synthesis Example 4 (Synthesis of diethyl fumarate/monoethyl fumarate Copolymer)

A 75 mL-volume glass ampoule was charged with 41 g of diethyl fumarate, 8.7 g of monoethyl fumarate and 0.48 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 72 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 15 g of a diethyl fumarate/monoethyl fumarate copolymer. The obtained polymer had a number average molecular weight of 16,000 and was composed of 82 mol % of diethyl fumarate residue unit and 18 mol % of monoethyl fumarate residue unit.

Synthesis Example 5 (Synthesis of diethyl fumarate/monoethyl fumarate Copolymer)

A 75 mL-volume glass ampoule was charged with 12 g of diethyl fumarate, 23.4 g of monoethyl fumarate and 0.39 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 20 g of a diethyl fumarate/monoethyl fumarate copolymer. The obtained polymer had a number average molecular weight of 28,000 and was composed of 33 mol % of diethyl fumarate residue unit and 67 mol % of monoethyl fumarate residue unit.

Synthesis Example 6 (Synthesis of diethyl fumarate/monoisopropyl fumarate Copolymer)

A 75 mL-volume glass ampoule was charged with 41 g of diethyl fumarate, 9.3 g of monoisopropyl fumarate and 0.61 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 72 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 14 g of a diethyl fumarate/monoisopropyl fumarate copolymer. The obtained polymer had a number average molecular weight of 14,000 and was composed of 82 mol % of diethyl fumarate residue unit and 18 mol % of monoisopropyl fumarate residue unit.

Synthesis Example 7 (Synthesis of diethyl fumarate/monoisopropyl fumarate/isopropyl cinnamate Copolymer)

A 75 mL-volume glass ampoule was charged with 46 g of diethyl fumarate, 2.5 g of monoisopropyl fumarate, 2.0 g of isopropyl cinnamate and 0.60 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 144 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 12 g of a diethyl fumarate/monoisopropyl fumarate/isopropyl cinnamate copolymer. The obtained polymer had a number average molecular weight of 12,000 and was composed of 90 mol % of diethyl fumarate residue unit, 5 mol % of monoisopropyl fumarate residue unit and 5 mol % of isopropyl cinnamate residue unit.

Synthesis Example 8 (Synthesis of diisopropyl fumarate/monoethyl fumarate Copolymer)

A 75 mL-volume glass ampoule was charged with 42 g of diisopropyl fumarate, 7.7 g of monoethyl fumarate and 0.66 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 27 g of a diisopropyl fumarate/monoethyl fumarate copolymer. The obtained polymer had a number average molecular weight of 53,000 and was composed of 82 mol % of diisopropyl fumarate residue unit and 18 mol % of monoethyl fumarate residue unit.

Synthesis Example 9 (Synthesis of diisopropyl fumarate/monoethyl fumarate Copolymer)

A 75 mL-volume glass ampoule was charged with 38 g of diisopropyl fumarate, 12 g of monoethyl fumarate and 0.68 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 22 g of a diisopropyl fumarate/monoethyl fumarate copolymer. The obtained polymer had a number average molecular weight of 29,000 and was composed of 73 mol % of diisopropyl fumarate residue unit and 27 mol % of monoethyl fumarate residue unit.

Synthesis Example 10 (Synthesis of diisopropyl fumarate/monoethyl fumarate Copolymer)

A 75 mL-volume glass ampoule was charged with 34 g of diisopropyl fumarate, 16 g of monoethyl fumarate and 0.58 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 22 g of a diisopropyl fumarate/monoethyl fumarate copolymer. The obtained polymer had a number average molecular weight of 31,000 and was composed of 64 mol % of diisopropyl fumarate residue unit and 36 mol % of monoethyl fumarate residue unit.

Synthesis Example 11 (Synthesis of diisopropyl fumarate/monoethyl fumarate Copolymer)

A 75 mL-volume glass ampoule was charged with 16 g of diisopropyl fumarate, 26.9 g of monoethyl fumarate and 0.44 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 23 g of a diisopropyl fumarate/monoethyl fumarate copolymer. The obtained polymer had a number average molecular weight of 31,000 and was composed of 32 mol % of diisopropyl fumarate residue unit and 68 mol % of monoethyl fumarate residue unit.

Synthesis Example 12 (Synthesis of diisopropyl fumarate/monoisopropyl fumarate Copolymer)

A 75 mL-volume glass ampoule was charged with 33 g of diisopropyl fumarate, 17 g of monoisopropyl fumarate and 0.57 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 17 g of a diisopropyl fumarate/monoisopropyl fumarate copolymer. The obtained polymer had a number average molecular weight of 26,000 and was composed of 65 mol % of diisopropyl fumarate residue unit and 35 mol % of monoisopropyl fumarate residue unit.

Synthesis Example 13 (Synthesis of diisopropyl fumarate/monoisopropyl fumarate Copolymer)

A 75 mL-volume glass ampoule was charged with 28 g of diisopropyl fumarate, 22 g of monoisopropyl fumarate and 0.58 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 15 g of a diisopropyl fumarate/monoisopropyl fumarate copolymer. The obtained polymer had a number average molecular weight of 23,000 and was composed of 58 mol % of diisopropyl fumarate residue unit and 42 mol % of monoisopropyl fumarate residue unit.

Synthesis Example 14 (Synthesis of diisopropyl fumarate/monoisopropyl fumarate/isopropyl cinnamate Copolymer)

A 75 mL-volume glass ampoule was charged with 32 g of diisopropyl fumarate, 13 g of monoisopropyl fumarate, 5 g of isopropyl cinnamate and 0.56 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 144 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 15 g of a diisopropyl fumarate/monoisopropyl fumarate/isopropyl cinnamate copolymer. The obtained polymer had a number average molecular weight of 19,000 and was composed of 58 mol % of diisopropyl fumarate residue unit, 26 mol % of monoisopropyl fumarate residue unit, and 16 mol % of isopropyl cinnamate residue unit.

Synthesis Example 15 (Synthesis of diisopropyl fumarate/monoisopropyl fumarate/ethyl cinnamate Copolymer)

A 75 mL-volume glass ampoule was charged with 32 g of diisopropyl fumarate, 13 g of monoisopropyl fumarate, 5 g of ethyl cinnamate and 0.56 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 144 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 14 g of a diisopropyl fumarate/monoisopropyl fumarate/ethyl cinnamate copolymer. The obtained polymer had a number average molecular weight of 15,000 and was composed of 57 mol % of diisopropyl fumarate residue unit, 28 mol % of monoisopropyl fumarate residue unit, and 15 mol % of ethyl cinnamate residue unit.

Synthesis Example 16 (Synthesis of di-tert-butyl fumarate)

After charging 60 mL of ethylene glycol dimethyl ether, 20 g of maleic acid and 4 g of sulfuric acid into a 300-mL autoclave equipped with a stirrer and a thermometer, 51 g of 2-methylpropylene was charged under pressure and reacted at 40° C. for 2 hours while stirring.

Subsequently, 80 mL of an ethylene glycol dimethyl ether solution of di-tert-butyl maleate, obtained by neutralizing and water-washing the reaction solution obtained by the reaction above, and 0.3 g of piperidine were charged into a 150-mL three-neck flask equipped with a stirrer, a condenser and a thermometer and reacted at 110° C. for 2 hours while stirring. The obtained reaction solution was GC-analyzed, as a result, the rate of isomerization to di-tert-butyl fumarate was 99%. The solvent of the obtained reaction solution was distilled off and then sublimated to obtain 22 g of di-tert-butyl fumarate with a purity of 99%.

Synthesis Example 17 (Synthesis of di-tert-butyl fumarate/monoethyl fumarate Copolymer)

A 75 mL-volume glass ampoule was charged with 43 g of di-tert-butyl fumarate, 6.8 g of monoethyl fumarate and 0.59 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 33 g of a di-tert-butyl fumarate/monoethyl fumarate copolymer. The obtained polymer had a number average molecular weight of 65,000 and was composed of 82 mol % of di-tert-butyl fumarate residue unit and 18 mol % of monoethyl fumarate residue unit.

Synthesis Example 18 (Synthesis of di-tert-butyl fumarate/monoethyl fumarate Copolymer)

A 75 mL-volume glass ampoule was charged with 39 g of di-tert-butyl fumarate, 11 g of monoethyl fumarate and 0.61 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 26 g of a di-tert-butyl fumarate/monoethyl fumarate copolymer. The obtained polymer had a number average molecular weight of 42,000 and was composed of 73 mol % of di-tert-butyl fumarate residue unit and 27 mol % of monoethyl fumarate residue unit.

Synthesis Example 19 (Synthesis of di-tert-butyl fumarate/monoethyl fumarate Copolymer)

A 75 mL-volume glass ampoule was charged with 35 g of di-tert-butyl fumarate, 15 g of monoethyl fumarate and 0.53 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 25 g of a di-tert-butyl fumarate/monoethyl fumarate copolymer. The obtained polymer had a number average molecular weight of 36,000 and was composed of 64 mol % of di-tert-butyl fumarate residue unit and 36 mol % of monoethyl fumarate residue unit.

Synthesis Example 20 (Synthesis of di-tert-butyl fumarate/monoethyl fumarate Copolymer)

A 75 mL-volume glass ampoule was charged with 18 g of di-tert-butyl fumarate, 26.5 g of monoethyl fumarate and 0.44 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 27 g of a di-tert-butyl fumarate/monoethyl fumarate copolymer. The obtained polymer had a number average molecular weight of 34,000 and was composed of 35 mol % of di-tert-butyl fumarate residue unit and 65 mol % of monoethyl fumarate residue unit.

Synthesis Example 21 (Synthesis of di-tert-butyl fumarate/monoisopropyl fumarate Copolymer)

A 75 mL-volume glass ampoule was charged with 34 g of di-tert-butyl fumarate, 16 g of monoisopropyl fumarate and 0.57 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 20 g of a di-tert-butyl fumarate/monoisopropyl fumarate copolymer. The obtained polymer had a number average molecular weight of 30,000 and was composed of 65 mol % of di-tert-butyl fumarate residue unit and 35 mol % of monoisopropyl fumarate residue unit.

Synthesis Example 22 (Synthesis of di-tert-butyl fumarate/monoisopropyl fumarate Copolymer)

A 75 mL-volume glass ampoule was charged with 30 g of di-tert-butyl fumarate, 20 g of monoisopropyl fumarate and 0.54 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 84 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 17 g of a di-tert-butyl fumarate/monoisopropyl fumarate copolymer. The obtained polymer had a number average molecular weight of 25,000 and was composed of 58 mol % of di-tert-butyl fumarate residue unit and 42 mol % of monoisopropyl fumarate residue unit.

Synthesis Example 23 (Synthesis of di-tert-butyl fumarate/monoisopropyl fumarate/isopropyl cinnamate Copolymer)

A 75 mL-volume glass ampoule was charged with 34 g of di-tert-butyl fumarate, 12 g of monoisopropyl fumarate, 4.7 g of isopropyl cinnamate and 0.51 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 144 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 17 g of a di-tert-butyl fumarate/monoisopropyl fumarate/isopropyl cinnamate copolymer. The obtained polymer had a number average molecular weight of 23,000 and was composed of 58 mol % of di-tert-butyl fumarate residue unit, 26 mol % of monoisopropyl fumarate residue unit, and 16 mol % of isopropyl cinnamate residue unit.

Synthesis Example 24 (Synthesis of di-tert-butyl fumarate/monoisopropyl fumarate/ethyl cinnamate Copolymer)

A 75 mL-volume glass ampoule was charged with 34 g of di-tert-butyl fumarate, 12 g of monoisopropyl fumarate, 4.3 g of ethyl cinnamate and 0.51 g of tert-butyl peroxypivalate as a polymerization initiator and after repeating purging with nitrogen and release of the pressure, sealed by fusion in the pressure-reduced state. This ampoule was placed in a constant temperature bath at 46° C. and held for 144 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 16 g of a di-tert-butyl fumarate/monoisopropyl fumarate/ethyl cinnamate copolymer. The obtained polymer had a number average molecular weight of 18,000 and was composed of 57 mol % of di-tert-butyl fumarate residue unit, 28 mol % of monoisopropyl fumarate residue unit, and 15 mol % of ethyl cinnamate residue unit.

Synthesis Example 25 (Synthesis of diisopropyl fumarate/diethyl fumarate/2-hydroxyethyl acrylate Copolymer)

A 75 mL-volume glass ampoule was charged with 41 g of diisopropyl fumarate, 5 g of diethyl fumarate, 4 g of 2-hydroxyethyl acrylate and 0.67 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 28 g of a diisopropyl fumarate/diethyl fumarate/2-hydroxyethyl acrylate copolymer. The obtained polymer had a number average molecular weight of 53,000 and was composed of 80 mol % of diisopropyl fumarate residue unit, 10 mol % of diethyl fumarate residue unit, and 10 mol % of 2-hydroxyethyl acrylate residue unit.

Synthesis Example 26 (Synthesis of diisopropyl fumarate/di-s-butyl fumarate/2-hydroxyethyl methacrylate Copolymer)

A 75 mL-volume glass ampoule was charged with 37 g of diisopropyl fumarate, 9 g of di-s-butyl fumarate, 4 g of 2-hydroxyethyl methacrylate and 0.64 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 23 g of a diisopropyl fumarate/di-s-butyl fumarate/2-hydroxyethyl methacrylate copolymer. The obtained polymer had a number average molecular weight of 44,000 and was composed of 75 mol % of diisopropyl fumarate residue unit, 15 mol % of di-s-butyl fumarate residue unit, and 10 mol % of 2-hydroxyethyl methacrylate residue unit.

Synthesis Example 27 (Synthesis of diisopropyl fumarate/diethyl fumarate/N-tert-butylmethacrylamide Copolymer)

A 75 mL-volume glass ampoule was charged with 37 g of diisopropyl fumarate, 9 g of diethyl fumarate, 4 g of N-tert-butylmethacrylamide and 0.63 g of tert-butyl peroxypivalate as a polymerization initiator and after repeating purging with nitrogen and release of the pressure, sealed by fusion in the pressure-reduced state. This ampoule was placed in a constant temperature bath at 50° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 35 g of a diisopropyl fumarate/diethyl fumarate/N-tert-butylmethacrylamide copolymer. The obtained polymer had a number average molecular weight of 41,000 and was composed of 72 mol % of diisopropyl fumarate residue unit, 18 mol % of diethyl fumarate residue unit, and 10 mol % of N-tert-butylmethacrylamide residue unit.

Synthesis Example 28 (Synthesis of diisopropyl fumarate/N-(n-butoxymethyl)acrylamide Copolymer)

A 75 mL-volume glass ampoule was charged with 44 g of diisopropyl fumarate, 6 g of N-(n-butoxymethyl)acrylamide and 0.63 g of tert-butyl peroxypivalate as a polymerization initiator and after repeating purging with nitrogen and release of the pressure, sealed by fusion in the pressure-reduced state. This ampoule was placed in a constant temperature bath at 55° C. and held for 24 hours, thereby performing radical polymerization. After the completion of polymerization reaction, the polymerization product was taken out of the ampoule and dissolved in 200 g of tetrahydrofuran. The resulting polymer solution was added dropwise to 4 L of hexane and precipitated, and the precipitate was vacuum-dried at 80° C. for 10 hours to obtain 38 g of a diisopropyl fumarate/N-(n-butoxymethyl)acrylamide copolymer. The obtained polymer had a number average molecular weight of 56,000 and was composed of 87 mol % of diisopropyl fumarate residue unit and 13 mol % of N-(n-butoxymethyl)acrylamide residue unit.

Synthesis Example 29 (Synthesis of diisopropyl fumarate/di-n-butyl fumarate Copolymer)

A 5-liter autoclave was charged with 2,600 g of distilled water containing 0.2 wt % of hydroxypropylmethyl cellulose, 1,232 g of diisopropyl fumarate, 168 g of di-n-butyl fumarate and 11 g of a polymerization initiator (trade name: Perbutyl PV, produced by NOF Corporation), and suspension radical polymerization reaction was performed under the conditions of a polymerization temperature of 47° C. and a polymerization time of 36 hours. The polymer particle obtained was collected by filtration, thoroughly washed with water and methanol, and then dried at 80° C. to obtain a diisopropyl fumarate/di-n-butyl fumarate copolymer. The obtained polymer had a number average molecular weight of 88,000 and was composed of 88 mol % of diisopropyl fumarate residue unit and 12 mol % of di-n-butyl fumarate residue unit.

Synthesis Example 30 (Synthesis of di-tert-butyl fumarate/di-n-butyl fumarate Copolymer)

A 5-liter autoclave was charged with 2,600 g of distilled water containing 0.2 wt % of hydroxypropylmethyl cellulose, 1,404 g of di-tert-butyl fumarate, 168 g of di-n-butyl fumarate and 11 g of a polymerization initiator (trade name: Perbutyl PV, produced by NOF Corporation), and suspension radical polymerization reaction was performed under the conditions of a polymerization temperature of 47° C. and a polymerization time of 36 hours. The polymer particle obtained was collected by filtration, thoroughly washed with water and methanol, and then dried at 80° C. to obtain a di-tert-butyl fumarate/di-n-butyl fumarate copolymer. The obtained polymer had a number average molecular weight of 102,000 and was composed of 88 mol % of di-tert-butyl fumarate residue unit and 12 mol % of di-n-butyl fumarate residue unit.

Example 1

83 g of ethyl cellulose (ETHOCEL standard 100, produced by Dow Chemical Co., molecular weight Mn=55,000, molecular weight Mw=176,000, Mw/Mn=3.2, total degree of substitution DS=2.5) and 67 g of the diethyl fumarate polymer obtained in Synthesis Example 1 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate polymer: 45 wt %). The optical compensation film obtained was cut into a 50 mm square and uniaxially stretched to 2.0 times at 150° C. (thickness after stretching: 40 μm).

The resulting optical compensation film was measured for light transmittance, haze, retardation characteristics and wavelength dispersion characteristics, and the results thereof are shown in Table 1.

TABLE 1

| | Light Transmittance (%) | Haze (%) | Re (nm) | Rth (nm) | Nz Coefficient | Re(450)/Re(550) |
|---|---|---|---|---|---|---|
| Example 1 | 92 | 0.8 | 156 | 14 | 0.59 | 0.92 |
| Example 2 | 92 | 0.9 | 248 | 16 | 0.56 | 0.90 |
| Example 3 | 93 | 0.7 | 152 | 20 | 0.63 | 0.91 |
| Example 4 | 93 | 0.7 | 248 | 28 | 0.61 | 0.91 |
| Example 5 | 93 | 0.6 | 149 | 15 | 0.58 | 0.92 |
| Example 6 | 93 | 0.6 | 237 | 15 | 0.56 | 0.89 |
| Example 7 | 93 | 0.4 | 140 | 18 | 0.63 | 0.93 |
| Example 8 | 93 | 0.5 | 220 | 13 | 0.62 | 0.92 |
| Example 9 | 92 | 0.8 | 157 | 11 | 0.59 | 0.98 |
| Example 10 | 93 | 0.5 | 140 | 13 | 0.59 | 0.91 |
| Example 11 | 93 | 0.5 | 224 | 19 | 0.58 | 0.90 |
| Example 12 | 93 | 0.6 | 155 | 14 | 0.59 | 0.86 |
| Example 13 | 92 | 0.7 | 220 | 20 | 0.59 | 0.84 |

The obtained optical compensation film exhibited high light transmittance, excellent transparency and small haze and had target optical properties in terms of in-plane retardation (Re), Nz coefficient and wavelength dispersion characteristics.

Example 2

83 g of ethyl cellulose used in Example 1 and 67 g of the diethyl fumarate polymer obtained in Synthesis Example 1 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate polymer: 45 wt %). The optical compensation film obtained was cut into a 50 mm square and uniaxially stretched to 3.5 times at 150° C. (thickness after stretching: 40 μm).

The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 3

83 g of ethyl cellulose used in Example 1 and 67 g of the diethyl fumarate/monoethyl fumarate copolymer obtained in Synthesis Example 2 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate/monoethyl fumarate copolymer: 45 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 4

83 g of ethyl cellulose used in Example 1 and 67 g of the diethyl fumarate/monoethyl fumarate copolymer obtained in Synthesis Example 2 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate/monoethyl fumarate copolymer: 45 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 5

80 g of ethyl cellulose used in Example 1 and 70 g of the diethyl fumarate/monoethyl fumarate copolymer obtained in Synthesis Example 3 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 53 wt %, diethyl fumarate/monoethyl fumarate copolymer: 47 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 6

80 g of ethyl cellulose used in Example 1 and 70 g of the diethyl fumarate/monoethyl fumarate copolymer obtained in Synthesis Example 3 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 53 wt %, diethyl fumarate/monoethyl fumarate copolymer: 47 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 7

75 g of ethyl cellulose used in Example 1 and 75 g of the diethyl fumarate/monoethyl fumarate copolymer obtained in Synthesis Example 4 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoethyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 8

75 g of ethyl cellulose used in Example 1 and 75 g of the diethyl fumarate/monoethyl fumarate copolymer obtained in Synthesis Example 4 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoethyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 9

90 g of ethyl cellulose used in Example 1 and 60 g of the diethyl fumarate/monoethyl fumarate copolymer obtained in Synthesis Example 5 were dissolved in methylene chloride:

acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diethyl fumarate/monoethyl fumarate copolymer: 40 wt %). The optical compensation film obtained was cut into a 50 mm square and uniaxially stretched to 3.5 times at 135° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 10

75 g of ethyl cellulose used in Example 1 and 75 g of the diethyl fumarate/monoisopropyl fumarate copolymer obtained in Synthesis Example 6 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoisopropyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 11

75 g of ethyl cellulose used in Example 1 and 75 g of the diethyl fumarate/monoisopropyl fumarate copolymer obtained in Synthesis Example 6 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoisopropyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 12

83 g of ethyl cellulose used in Example 1 and 67 g of the diethyl fumarate/monoisopropyl fumarate/isopropyl cinnamate copolymer obtained in Synthesis Example 7 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate/monoisopropyl fumarate/isopropyl cinnamate copolymer: 45 wt %). The optical compensation film obtained was cut into a 50 mm square and uniaxially stretched to 2.0 times at 150° C. (thickness after stretching: 40 μm).

The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 13

83 g of ethyl cellulose used in Example 1 and 67 g of the diethyl fumarate/monoisopropyl fumarate/isopropyl cinnamate copolymer obtained in Synthesis Example 7 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diethyl fumarate/monoisopropyl fumarate/isopropyl cinnamate copolymer: 45 wt %). The optical compensation film obtained was cut into a 50 mm square and uniaxially stretched to 3.5 times at 150° C. (thickness after stretching: 40 μm).

The resulting optical compensation film was measured for light transmittance, haze, retardation characteristics and wavelength dispersion characteristics, and the results thereof are shown together in Table 1.

The obtained optical compensation film exhibited high light transmittance, excellent transparency and small haze and had target optical properties in terms of in-plane retardation (Re), Nz coefficient and wavelength dispersion characteristics.

Example 14

90 g of ethyl cellulose used in Example 1 and 60 g of the diisopropyl fumarate/monoethyl fumarate copolymer obtained in Synthesis Example 8 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/monoethyl fumarate copolymer: 40 wt %). The optical compensation film obtained was cut into a 50 mm square and uniaxially stretched to 2.0 times at 150° C. (thickness after stretching: 40 μm).

The resulting optical compensation film was measured for light transmittance, haze, retardation characteristics and wavelength dispersion characteristics, and the results thereof are shown in Table 2.

TABLE 2

|  | Light Transmittance (%) | Haze (%) | Re (nm) | Rth (nm) | Nz Coefficient | Re(450)/Re(550) |
|---|---|---|---|---|---|---|
| Example 14 | 92 | 0.8 | 170 | 13 | 0.57 | 0.92 |
| Example 15 | 92 | 0.9 | 256 | 12 | 0.55 | 0.90 |
| Example 16 | 93 | 0.6 | 160 | 12 | 0.57 | 0.91 |
| Example 17 | 93 | 0.7 | 232 | 18 | 0.57 | 0.91 |
| Example 18 | 94 | 0.3 | 147 | 2 | 0.51 | 0.87 |
| Example 19 | 94 | 0.3 | 225 | 0 | 0.50 | 0.87 |
| Example 20 | 92 | 0.7 | 165 | 15 | 0.53 | 0.97 |
| Example 21 | 93 | 0.7 | 152 | −6 | 0.46 | 0.85 |
| Example 22 | 93 | 0.8 | 228 | −14 | 0.43 | 0.84 |
| Example 23 | 93 | 0.5 | 133 | 14 | 0.61 | 0.93 |
| Example 24 | 93 | 0.5 | 201 | 19 | 0.60 | 0.93 |
| Example 25 | 93 | 0.5 | 173 | 11 | 0.56 | 0.76 |
| Example 26 | 93 | 0.5 | 256 | 9 | 0.54 | 0.74 |
| Example 27 | 93 | 0.5 | 165 | 16 | 0.60 | 0.80 |
| Example 28 | 93 | 0.5 | 238 | 19 | 0.57 | 0.79 |

The obtained optical compensation film exhibited high light transmittance, excellent transparency and small haze and had target optical properties in terms of in-plane retardation (Re), Nz coefficient and wavelength dispersion characteristics.

Example 15

90 g of ethyl cellulose used in Example 1 and 60 g of the diisopropyl fumarate/monoethyl fumarate copolymer obtained in Synthesis Example 8 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/monoethyl fumarate copolymer: 40 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 16

82 g of ethyl cellulose used in Example 1 and 68 g of the diisopropyl fumarate/monoethyl fumarate copolymer obtained in Synthesis Example 9 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diisopropyl fumarate/monoethyl fumarate copolymer: 45 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 17

82 g of ethyl cellulose used in Example 1 and 68 g of the diisopropyl fumarate/monoethyl fumarate copolymer obtained in Synthesis Example 9 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, diisopropyl fumarate/monoethyl fumarate copolymer: 45 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 18

75 g of ethyl cellulose used in Example 1 and 75 g of the diisopropyl fumarate/monoethyl fumarate copolymer obtained in Synthesis Example 10 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoethyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 19

75 g of ethyl cellulose used in Example 1 and 75 g of the diisopropyl fumarate/monoethyl fumarate copolymer obtained in Synthesis Example 10 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoethyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 20

90 g of ethyl cellulose used in Example 1 and 60 g of the diisopropyl fumarate/monoethyl fumarate copolymer obtained in Synthesis Example 11 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/monoethyl fumarate copolymer: 40 wt %). The optical compensation film obtained was cut into a 50 mm square and uniaxially stretched to 3.5 times at 140° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 21

75 g of ethyl cellulose used in Example 1 and 75 g of the diisopropyl fumarate/monoisopropyl fumarate copolymer obtained in Synthesis Example 12 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoisopropyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 22

75 g of ethyl cellulose used in Example 1 and 75 g of the diisopropyl fumarate/monoisopropyl fumarate copolymer obtained in Synthesis Example 12 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoisopropyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 23

67 g of ethyl cellulose used in Example 1 and 83 g of the diisopropyl fumarate/monoisopropyl fumarate copolymer obtained in Synthesis Example 13 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 45 wt %, diisopropyl fumarate/monoisopropyl fumarate copolymer: 55 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 24

67 g of ethyl cellulose used in Example 1 and 83 g of the diisopropyl fumarate/monoisopropyl fumarate copolymer obtained in Synthesis Example 13 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 45 wt %, diisopropyl fumarate/monoisopropyl fumarate copolymer: 55 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 25

97 g of ethyl cellulose used in Example 1 and 53 g of the diisopropyl fumarate/monoisopropyl fumarate/isopropyl cinnamate copolymer obtained in Synthesis Example 14 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/monoisopropyl fumarate/isopropyl cinnamate copolymer: 35 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 26

97 g of ethyl cellulose used in Example 1 and 53 g of the diisopropyl fumarate/monoisopropyl fumarate/isopropyl cinnamate copolymer obtained in Synthesis Example 14 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/monoisopropyl fumarate/isopropyl cinnamate copolymer: 35 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 27

97 g of ethyl cellulose used in Example 1 and 53 g of the diisopropyl fumarate/monoisopropyl fumarate/ethyl cinnamate copolymer obtained in Synthesis Example 15 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/monoisopropyl fumarate/ethyl cinnamate copolymer: 35 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 28

97 g of ethyl cellulose used in Example 1 and 53 g of the diisopropyl fumarate/monoisopropyl fumarate/ethyl cinnamate copolymer obtained in Synthesis Example 15 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/monoisopropyl fumarate/ethyl cinnamate copolymer: 35 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 2.

The obtained optical compensation film exhibited high light transmittance, excellent transparency and small haze and had target optical properties in terms of in-plane retardation (Re), Nz coefficient and wavelength dispersion characteristics.

Example 29

90 g of ethyl cellulose used in Example 1 and 60 g of the di-tert-butyl fumarate/monoethyl fumarate copolymer obtained in Synthesis Example 17 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, di-tert-butyl fumarate/monoethyl fumarate copolymer: 40 wt %). The optical compensation film obtained was cut into a 50 mm square and uniaxially stretched to 2.0 times at 150° C. (thickness after stretching: 40 μm).

The resulting optical compensation film was measured for light transmittance, haze, retardation characteristics and wavelength dispersion characteristics, and the results thereof are shown in Table 3.

TABLE 3

| | Light Transmittance (%) | Haze (%) | Re (nm) | Rth (nm) | Nz Coefficient | Re(450)/Re(550) |
|---|---|---|---|---|---|---|
| Example 29 | 92 | 0.8 | 173 | 11 | 0.56 | 0.92 |
| Example 30 | 92 | 0.9 | 256 | 9 | 0.54 | 0.90 |
| Example 31 | 93 | 0.7 | 167 | 11 | 0.57 | 0.91 |
| Example 32 | 93 | 0.8 | 248 | 12 | 0.55 | 0.91 |
| Example 33 | 94 | 0.4 | 150 | −3 | 0.48 | 0.86 |
| Example 34 | 93 | 0.5 | 222 | −4 | 0.48 | 0.85 |
| Example 35 | 92 | 0.8 | 171 | 21 | 0.56 | 0.96 |
| Example 36 | 93 | 0.7 | 152 | −12 | 0.42 | 0.84 |
| Example 37 | 93 | 0.8 | 225 | −18 | 0.42 | 0.84 |

TABLE 3-continued

|  | Light Transmittance (%) | Haze (%) | Re (nm) | Rth (nm) | Nz Coefficient | Re(450)/Re(550) |
|---|---|---|---|---|---|---|
| Example 38 | 93 | 0.4 | 128 | 12 | 0.59 | 0.93 |
| Example 39 | 93 | 0.5 | 184 | 12 | 0.57 | 0.93 |
| Example 40 | 93 | 0.5 | 170 | 6 | 0.54 | 0.76 |
| Example 41 | 93 | 0.6 | 240 | 0 | 0.50 | 0.73 |
| Example 42 | 93 | 0.5 | 172 | 18 | 0.60 | 0.80 |
| Example 43 | 93 | 0.5 | 248 | 12 | 0.55 | 0.79 |

The obtained optical compensation film exhibited high light transmittance, excellent transparency and small haze and had target optical properties in terms of in-plane retardation (Re), Nz coefficient and wavelength dispersion characteristics.

Example 30

90 g of ethyl cellulose used in Example 1 and 60 g of the di-tert-butyl fumarate/monoethyl fumarate copolymer obtained in Synthesis Example 17 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, di-tert-butyl fumarate/monoethyl fumarate copolymer: 40 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 31

82 g of ethyl cellulose used in Example 1 and 68 g of the di-tert-butyl fumarate/monoethyl fumarate copolymer obtained in Synthesis Example 18 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, di-tert-butyl fumarate/monoethyl fumarate copolymer: 45 wt %). The optical compensation film obtained was cut into a 50 mm square and uniaxially stretched to 2.0 times at 150° C. (thickness after stretching: 40 The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 32

82 g of ethyl cellulose used in Example 1 and 68 g of the di-tert-butyl fumarate/monoethyl fumarate copolymer obtained in Synthesis Example 18 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 55 wt %, di-tert-butyl fumarate/monoethyl fumarate copolymer: 45 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 33

75 g of ethyl cellulose used in Example 1 and 75 g of the di-tert-butyl fumarate/monoethyl fumarate copolymer obtained in Synthesis Example 19 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoethyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 34

75 g of ethyl cellulose used in Example 1 and 75 g of the di-tert-butyl fumarate/monoethyl fumarate copolymer obtained in Synthesis Example 19 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoethyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 35

90 g of ethyl cellulose used in Example 1 and 60 g of the di-tert-butyl fumarate/monoethyl fumarate copolymer obtained in Synthesis Example 20 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, di-tert-butyl fumarate/monoethyl fumarate copolymer: 40 wt %). The optical compensation film obtained was cut into a 50 mm square and uniaxially stretched to 3.5 times at 145° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 36

75 g of ethyl cellulose used in Example 1 and 75 g of the di-tert-butyl fumarate/monoisopropyl fumarate copolymer obtained in Synthesis Example 21 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoisopropyl fumarate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 37

75 g of ethyl cellulose used in Example 1 and 75 g of the di-tert-butyl fumarate/monoisopropyl fumarate copolymer obtained in Synthesis Example 21 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoisopropyl fumarate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 38

67 g of ethyl cellulose used in Example 1 and 83 g of the di-tert-butyl fumarate/monoisopropyl fumarate copolymer obtained in Synthesis Example 22 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 45 wt %, di-tert-butyl fumarate/monoisopropyl fumarate copolymer: 55 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 39

67 g of ethyl cellulose used in Example 1 and 83 g of the di-tert-butyl fumarate/monoisopropyl fumarate copolymer obtained in Synthesis Example 22 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 45 wt %, di-tert-butyl fumarate/monoisopropyl fumarate copolymer: 55 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 40

97 g of ethyl cellulose used in Example 1 and 53 g of the di-tert-butyl fumarate/monoisopropyl fumarate/isopropyl cinnamate copolymer obtained in Synthesis Example 23 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, di-tert-butyl fumarate/monoisopropyl fumarate/isopropyl cinnamate copolymer: 35 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 41

97 g of ethyl cellulose used in Example 1 and 53 g of the di-tert-butyl fumarate/monoisopropyl fumarate/isopropyl cinnamate copolymer obtained in Synthesis Example 23 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, di-tert-butyl fumarate/monoisopropyl fumarate/isopropyl cinnamate copolymer: 35 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 42

97 g of ethyl cellulose used in Example 1 and 53 g of the di-tert-butyl fumarate/monoisopropyl fumarate/ethyl cinnamate copolymer obtained in Synthesis Example 24 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, di-tert-butyl fumarate/monoisopropyl fumarate/ethyl cinnamate copolymer: 35 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 43

97 g of ethyl cellulose used in Example 1 and 53 g of the di-tert-butyl fumarate/monoisopropyl fumarate/ethyl cinnamate copolymer obtained in Synthesis Example 24 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, di-tert-butyl fumarate/monoisopropyl fumarate/ethyl cinnamate copolymer: 35 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 3.

The obtained optical compensation film exhibited high light transmittance, excellent transparency and small haze and had target optical properties in terms of in-plane retardation (Re), Nz coefficient and wavelength dispersion characteristics.

Example 44

80 g of ethyl cellulose used in Example 1 and 70 g of the diisopropyl fumarate/diethyl fumarate/2-hydroxyethyl acrylate copolymer obtained in Synthesis Example 25 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 53 wt %, diisopropyl fumarate/diethyl fumarate/2-hydroxyethyl acrylate copolymer: 47 wt %). The optical compensation film obtained was cut into a 50 mm square and uniaxially stretched to 2.0 times at 150° C. (thickness after stretching: 40 μm).

The resulting optical compensation film was measured for light transmittance, haze, retardation characteristics and wavelength dispersion characteristics, and the results thereof are shown together in Table 4.

TABLE 4

| | Light Transmittance (%) | Haze (%) | Re (nm) | Rth (nm) | Nz Coefficient | Re(450)/Re(550) |
|---|---|---|---|---|---|---|
| Example 44 | 93 | 0.6 | 140 | 6 | 0.54 | 0.92 |
| Example 45 | 93 | 0.7 | 259 | 11 | 0.54 | 0.92 |
| Example 46 | 93 | 0.6 | 132 | −6 | 0.45 | 0.91 |
| Example 47 | 93 | 0.7 | 252 | −6 | 0.48 | 0.91 |
| Example 48 | 93 | 0.5 | 148 | 18 | 0.62 | 0.91 |
| Example 49 | 93 | 0.5 | 272 | 33 | 0.62 | 0.91 |
| Example 50 | 92 | 0.7 | 168 | 0 | 0.50 | 0.91 |
| Example 51 | 92 | 0.9 | 300 | 6 | 0.52 | 0.90 |

The obtained optical compensation film exhibited high light transmittance, excellent transparency and small haze and had target optical properties in terms of in-plane retardation (Re), Nz coefficient and wavelength dispersion characteristics.

Example 45

80 g of ethyl cellulose used in Example 1 and 70 g of the diisopropyl fumarate/diethyl fumarate/2-hydroxyethyl acrylate copolymer obtained in Synthesis Example 25 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 53 wt %, diisopropyl fumarate/diethyl fumarate/2-hydroxyethyl acrylate copolymer: 47 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 46

75 g of ethyl cellulose used in Example 1 and 75 g of the diisopropyl fumarate/di-s-butyl fumarate/2-hydroxyethyl methacrylate copolymer obtained in Synthesis Example 26 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 50 wt %, diisopropyl fumarate/di-s-butyl fumarate/2-hydroxyethyl methacrylate copolymer: 50 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 47

75 g of ethyl cellulose used in Example 1 and 75 g of the diisopropyl fumarate/di-s-butyl fumarate/2-hydroxyethyl methacrylate copolymer obtained in Synthesis Example 26 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 50 wt %, diisopropyl fumarate/di-s-butyl fumarate/2-hydroxyethyl methacrylate copolymer: 50 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 48

83 g of ethyl cellulose used in Example 1 and 67 g of the diisopropyl fumarate/diethyl fumarate/N-tert-butylmethacrylamide copolymer obtained in Synthesis Example 27 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 55 wt %, diisopropyl fumarate/diethyl fumarate/N-tert-butylmethacrylamide copolymer: 45 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 49

83 g of ethyl cellulose used in Example 1 and 67 g of the diisopropyl fumarate/diethyl fumarate/N-tert-butylmethacrylamide copolymer obtained in Synthesis Example 27 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 55 wt %, diisopropyl fumarate/diethyl fumarate/N-tert-butylmethacrylamide copolymer: 45 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 50

87 g of ethyl cellulose used in Example 1 and 63 g of the diisopropyl fumarate/N-(n-butoxymethyl)acrylamide copolymer obtained in Synthesis Example 28 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 58 wt %, diisopropyl fumarate/N-(n-butoxymethyl)acrylamide copolymer: 42 wt %). The optical compensation film obtained was cut into a 50 mm square and uniaxially stretched to 2.0 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 51

87 g of ethyl cellulose used in Example 1 and 63 g of the diisopropyl fumarate/N-(n-butoxymethyl)acrylamide copolymer obtained in Synthesis Example 28 were dissolved in toluene:acetone=9:1 (weight ratio) to make a 15 wt % resin solution, and the resin solution was cast on a polyethylene terephthalate film by means of a coater and dried at a drying temperature of 60° C. to obtain an optical compensation film (resin composition) having a width of 150 mm (ethyl cellulose: 58 wt %, diisopropyl fumarate/N-(n-butoxymethyl)acrylamide copolymer: 42 wt %). The optical compensation film obtained was cut into a 50 mm square and uniaxially stretched to 3.5 times at 150° C. (thickness after stretching: 40 μm). The resulting optical compensation film was measured for light transmittance, haze, retardation characteristics and wavelength dispersion characteristics, and the results thereof are shown together in Table 4.

The obtained optical compensation film exhibited high light transmittance, excellent transparency and small haze and had target optical properties in terms of in-plane retardation (Re), Nz coefficient and wavelength dispersion characteristics.

Example 52

97 g of ethyl cellulose used in Example 1 and 53 g of the diisopropyl fumarate/di-n-butyl fumarate copolymer obtained in Synthesis Example 29 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm and a thickness of 40 μm (ethyl cellulose: 65 wt %, diisopropyl fumarate/di-n-butyl fumarate copolymer: 35 wt %). The optical compensation film obtained was cut into a 50 mm square and uniaxially stretched to 2.0 times at 150° C. The resulting optical compensation film was measured for light transmittance, haze, retardation characteristics and wavelength dispersion characteristics, and the results thereof are shown in Table 5.

TABLE 5

|  | Light Transmittance (%) | Haze (%) | Re (nm) | Rth (nm) | Nz Coefficient | Re(450)/Re(550) |
|---|---|---|---|---|---|---|
| Example 52 | 78 | 13.5 | 185 | 14 | 0.57 | 0.90 |
| Example 53 | 77 | 17.0 | 180 | 6 | 0.53 | 0.90 |

The obtained optical compensation film had target optical properties in terms of in-plane retardation (Re), Nz coefficient and wavelength dispersion characteristics.

Example 53

97 g of ethyl cellulose used in Example 1 and 53 g of the di-tert-butyl fumarate/di-n-butyl fumarate copolymer obtained in Synthesis Example 30 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm and a thickness of 40 μm (ethyl cellulose: 65 wt %, di-tert-butyl fumarate/di-n-butyl fumarate copolymer: 35 wt %). The optical compensation film obtained was cut into a 50 mm square and uniaxially stretched to 2.0 times at 150° C. The resulting optical compensation film was measured for light transmittance, haze, retardation characteristics and wavelength dispersion characteristics, and the results thereof are shown together in Table 5.

The obtained optical compensation film had target optical properties in terms of in-plane retardation (Re), Nz coefficient and wavelength dispersion characteristics.

Comparative Example 1

150 g of cellulose acetate butyrate (acetyl group=15 mol %, butyryl group=70 mol %, total degree of substitution DS=2.55, number average molecular weight: 72,000) was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film having a width of 150 mm and a thickness of 40 μm. The obtained film was measured for light transmittance, haze, retardation characteristics and wavelength dispersion characteristics, and the results thereof are shown in Table 6.

TABLE 6

|  | Light Transmittance (%) | Haze (%) | Re (nm) | Rth (nm) | Nz Coefficient | Re(450)/Re(550) |
|---|---|---|---|---|---|---|
| Comparative Example 1 | 92 | 0.7 | 261 | 11 | 1.3 | 1.07 |
| Comparative Example 2 | 94 | 0.3 | 304 | 732 | 2.9 | 1.00 |
| Comparative Example 3 | 94 | 0.3 | 297 | 717 | 2.9 | 1.00 |
| Comparative Example 4 | 93 | 0.4 | 1 | −172 | — | 1.05 |
| Comparative Example 5 | 91 | 0.8 | 40 | −48 | −0.7 | 0.99 |
| Comparative Example 6 | 93 | 0.4 | 1 | −213 | — | 1.05 |
| Comparative Example 7 | 91 | 0.8 | 36 | −58 | −1.1 | 0.99 |
| Comparative Example 8 | 93 | 0.4 | 1 | −234 | — | 1.05 |
| Comparative Example 9 | 91 | 0.8 | 32 | −60 | −1.4 | 0.99 |
| Comparative Example 10 | 93 | 0.4 | 1 | −213 | — | 1.04 |
| Comparative Example 11 | 91 | 0.8 | 16 | −60 | −3.3 | 0.99 |

The obtained film exhibited high light transmittance, excellent transparency and small haze but did not have target optical properties in terms of target Nz coefficient and wavelength dispersion characteristics.

Comparative Example 2

150 g of ethyl cellulose used in Example 1 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film having a width of 150 mm and a thickness of 40 μm. The film obtained was measured for light transmittance, haze, retardation characteristics and wavelength dispersion characteristics, and the results thereof are shown together in Table 6.

The obtained film exhibited high light transmittance, excellent transparency and small haze but had a large out-of-plane retardation (Rth) in the thickness direction, failing in having target optical properties.

Comparative Example 3

150 g of ethyl cellulose used in Example 1 was dissolved in toluene:acetone=9:1 (weight ratio) to make a 15 wt % resin solution, and the resin solution was cast on a support of a solution casting apparatus by a T-die method and dried at a drying temperature of 60° C. to obtain a film having a width of 150 mm and a thickness of 40 μm. The film obtained was measured for light transmittance, haze, retardation characteristics and wavelength dispersion characteristics, and the results thereof are shown together in Table 6.

The obtained film exhibited high light transmittance, excellent transparency and small haze but had a large out-of-plane retardation (Rth) in the thickness direction, failing in having target optical properties.

Comparative Example 4

180 g of the diethyl fumarate polymer used in Example 1 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 80 μm. The film obtained was measured for light transmittance, haze, retardation characteristics and wavelength dispersion characteristics, and the results thereof are shown together in Table 6.

The obtained film exhibited high light transmittance, excellent transparency and small haze but had a small out-of-plane retardation (Rth) in the thickness direction, failing in having target optical properties.

Comparative Example 5

30 g of ethyl cellulose used in Example 1 and 120 g of the diethyl fumarate/monoethyl fumarate copolymer obtained in Synthesis Example 2 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm and a thickness of 200 μm (ethyl cellulose: 20 wt %, diethyl fumarate/monoethyl fumarate copolymer: 80 wt %). The optical compensation film obtained was cut into a 50 mm square and uniaxially stretched to 1.3 times at 150° C. The resulting optical compensation film was measured for light transmittance, haze, retardation characteristics and wavelength dispersion characteristics, and the results thereof are shown together in Table 6.

The obtained film exhibited high light transmittance, excellent transparency and small haze but did not have target optical properties in terms of Nz coefficient.

Comparative Example 6

180 g of the diisopropyl fumarate/monoethyl fumarate used in Example 14 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 80 μm. The film obtained was measured for light transmittance, haze, retardation characteristics and wavelength dispersion characteristics, and the results thereof are shown together in Table 6.

The obtained film exhibited high light transmittance, excellent transparency and small haze but had a small out-of-plane retardation (Rth) in the thickness direction, failing in having target optical properties.

Comparative Example 7

30 g of ethyl cellulose used in Example 1 and 120 g of the diisopropyl fumarate/monoethyl fumarate copolymer obtained in Synthesis Example 8 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm and a thickness of 200 μm (ethyl cellulose: 20 wt %, diisopropyl fumarate/monoethyl fumarate copolymer: 80 wt %). The optical compensation film obtained was cut into a 50 mm square and uniaxially stretched to 1.3 times at 150° C. The resulting optical compensation film was measured for light transmittance, haze, retardation characteristics and wavelength dispersion characteristics, and the results thereof are shown together in Table 6.

The obtained film exhibited high light transmittance, excellent transparency and small haze but did not have target optical properties in terms of Nz coefficient.

Comparative Example 8

180 g of the di-tert-butyl fumarate/monoethyl fumarate copolymer used in Example 29 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 80 μm. The film obtained was measured for light transmittance, haze, retardation characteristics and wavelength dispersion characteristics, and the results thereof are shown together in Table 6.

The obtained film exhibited high light transmittance, excellent transparency and small haze but had a small out-of-plane retardation (Rth) in the thickness direction, failing in having target optical properties.

Comparative Example 9

30 g of ethyl cellulose used in Example 1 and 120 g of the di-tert-butyl fumarate/monoethyl fumarate copolymer obtained in Synthesis Example 17 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm and a thickness of 200 μm (ethyl cellulose: 20 wt %, di-tert-butyl fumarate/monoethyl fumarate copolymer: 80 wt %). The optical compensation film obtained was cut into a 50 mm square and uniaxially stretched to 1.3 times at 150° C. The resulting optical compensation film was measured for light transmittance, haze, retardation characteristics and wavelength dispersion characteristics, and the results thereof are shown together in Table 6.

The obtained film exhibited high light transmittance, excellent transparency and small haze but did not have target optical properties in terms of Nz coefficient.

Comparative Example 10

180 g of the diisopropyl fumarate/diethyl fumarate/2-hydroxyethyl acrylate copolymer used in Example 44 was dissolved in toluene:acetone=9:1 (weight ratio) to make a 15 wt % resin solution, and the resin solution was cast on a support of a solution casting apparatus by a T-die method and dried at a drying temperature of 60° C. to obtain a film (resin composition) having a width of 150 mm and a thickness of 80 μm. The film obtained was measured for light transmittance, haze, retardation characteristics and wavelength dispersion characteristics, and the results thereof are shown together in Table 6.

The obtained film exhibited high light transmittance, excellent transparency and small haze but had a small out-of-plane retardation (Rth) in the thickness direction, failing in having target optical properties.

Comparative Example 11

30 g of ethyl cellulose used in Example 1 and 120 g of the diisopropyl fumarate/diethyl fumarate/2-hydroxyethyl acrylate copolymer obtained in Synthesis Example 25 were dissolved in toluene:acetone=9:1 (weight ratio) to make a 15 wt % resin solution, and the resin solution was cast on a support of a solution casting apparatus by a T-die method and dried at a drying temperature of 60° C. to obtain an optical compensation film (resin composition) having a width of 150 mm and a thickness of 200 μm (ethyl cellulose: 20 wt %, diisopropyl fumarate/diethyl fumarate/2-hydroxyethyl acrylate copolymer: 80 wt %). The optical compensation film obtained was cut into a 50 mm square and uniaxially stretched to 1.3 times at 150° C. The resulting optical compensation film was measured for light transmittance, haze, retardation characteristics and wavelength dispersion characteristics, and the results thereof are shown together in Table 6.

The obtained film exhibited high light transmittance, excellent transparency and small haze but did not have target optical properties in terms of Nz coefficient.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2013-121273) filed on Jun. 7, 2013, Japanese Patent Application (Patent Application No. 2013-146714) filed on Jul. 12, 2013, Japanese Patent Application (Patent Application No. 2013-158166) filed on Jul. 30, 2013, Japanese Patent Application (Patent Application No. 2014-011508) filed on Jan. 24, 2014, and Japanese Patent Application (Patent Application No. 2014-100895) filed on May 14, 2014, the entirety of which is incorporated herein by reference. In addition, all references cited herein are incorporated by reference herein in their entirety.

The invention claimed is:

1. A resin composition, comprising:
   from 30 to 99 wt % of a cellulose-based resin as a cellulose ether, represented by the following formula (1), wherein carboxymethyl cellulose, methyl cellulose, hydroxyethyl cellulose, and hydroxypropyl cellulose are excluded; and
   from 70 to 1 wt % of a fumaric acid ester polymer containing from 30 to 95 mol % of a fumaric acid diester residue unit represented by the following formula (2) and from 70 to 5 mol % of a furamic acid monoester residue unit represented by the following formula (3):

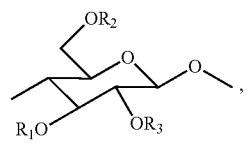
(1)

wherein each of $R_1$, $R_2$ and $R_3$ independently represents a substituent having a carbon number of 1 to 12:

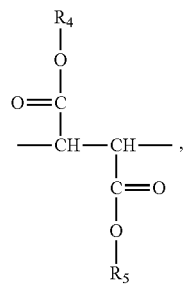
(2)

wherein $R_4$ and $R_5$ represent an alkyl group having a carbon number of 1 to 12,

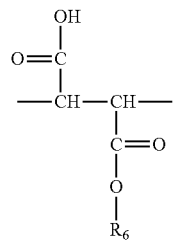
(3)

wherein $R_6$ represents an alkyl group having a carbon number of 1 to 12.

2. The resin composition according to claim 1, wherein the fumaric acid monoester residue unit is a fumaric acid monoester residue unit selected from the group consisting of a monomethyl fumarate residue unit, a monoethyl fumarate residue unit, a monoisopropyl fumarate residue unit, a mono-n-propyl fumarate residue unit, a mono-n-butyl fumarate residue unit and a mono-2-ethylhexyl fumarate residue unit.

3. The resin composition according to claim 1, wherein the fumaric acid ester polymer further comprises from 30 to 0.5 mol % of a residue unit selected from the group consisting of an acrylic acid ester residue unit represented by the following formula (4), a methacrylic acid ester residue unit represented by the following formula (5), an acrylic acid amide residue unit represented by the following formula (6) and a methacrylic acid amide residue unit represented by the following formula (7):

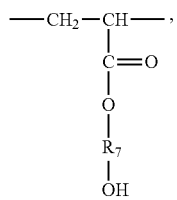                                                        (4)

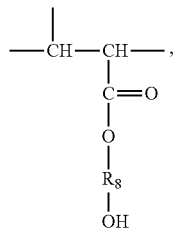                                                        (5)

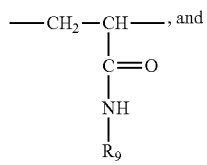                                                        (6)

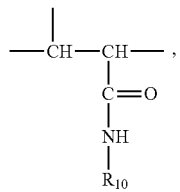                                                        (7)

wherein each of $R_7$, $R_8$, $R_9$ and $R_{10}$ independently represents an alkyl group having a carbon number of 1 to 12, an alkylene group or an ether group.

4. The resin composition according to claim 1, wherein an etherification degree, which is a substitution degree, of the cellulose-based resin as a cellulose ether represented by the formula (1) is from 1.5 to 3.0.

5. An optical compensation film, which is formed using the resin composition according to claim 1 and has a thickness of from 5 to 200 μm.

6. An optical compensation film, which is formed using the resin composition according to claim 1 and has a thickness of from 20 to 60 μm.

7. The optical compensation film according to claim 5, wherein an in-plane retardation (Re) represented by the following expression (1) is from 80 to 300 nm and an Nz coefficient represented by the following expression (2) is from 0.35 to 0.65:

$$Re=(ny-nx)\times d \quad (1)$$

$$Nz=(ny-nz)/(ny-nx) \quad (2),$$

wherein nx represents a refractive index in a fast axis direction in a film plane; ny represents a refractive index in a slow axis direction in a film plane; nz represents a refractive index outside a film plane; and d represents a film thickness.

8. The optical compensation film according to claim 5, wherein the in-plane retardation (Re) represented by the expression (1) is from 50 to 200 nm and the Nz coefficient represented by the expression (2) is from −0.2 to 0.2.

9. The optical compensation film according to claim 5, wherein the in-plane retardation (Re) represented by the expression (1) is from 0 to 20 nm and an out-of-plane retardation (Rth) represented by the following expression (3) is from −150 to 20 nm:

$$Rth=[(nx+ny)/2-nz]\times d \quad (3),$$

wherein nx represents a refractive index in a fast axis direction in a film plane; ny represents a refractive index in a slow axis direction in a film plane; nz represents a refractive index outside a film plane; and d represents a film thickness.

10. The optical compensation film according to claim 5, wherein a light transmittance is 85% or more.

11. The optical compensation film according to claim 5, wherein a haze is 1% or less.

12. The optical compensation film according to claim 5, wherein a ratio Re(450)/Re(550) between a retardation at 450 nm and a retardation at 550 nm is 0.60<Re(450)/Re(550)<1.05.

13. A method for producing an optical compensation film according to claim 7, the method comprising:
dissolving, in a solvent, a resin composition comprising from 30 to 99 wt % of a cellulose-based resin as a cellulose ether, represented by the following formula (1), and from 70 to 1 wt % of a fumaric acid ester polymer comprising 30 mol % or more of a fumaric acid diester residue unit represented by the following formula (2);
casting an obtained resin solution on a base material; and
after drying, separating a resulting film from the base material:

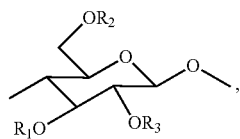                                                        (1)

wherein each of $R_1$, $R_2$ and $R_3$ independently represents a substituent having a carbon number of 1 to 12:

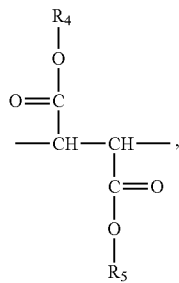                                                        (2)

wherein $R_4$ and $R_5$ represent an alkyl group having a carbon number of 1 to 12.

14. The production method of an optical compensation film according to claim 13, wherein an etherification degree of the cellulose-based resin as a cellulose ether represented by the formula (1) is from 1.5 to 3.0.

15. A method for producing an optical compensation film by using the resin composition according to claim 2.

16. A method for producing an optical compensation film according to claim 7, comprising:
   subjecting a film having a thickness of 10 to 200 μm obtained by casting to uniaxial stretching or unbalanced biaxial stretching.

17. A method for producing an optical compensation film according to claim 7, comprising:
   subjecting a film having a thickness of 30 to 100 μm obtained by casting to uniaxial stretching or unbalanced biaxial stretching.

* * * * *